(12) United States Patent
Hershkowitz et al.

(10) Patent No.: US 8,734,545 B2
(45) Date of Patent: May 27, 2014

(54) LOW EMISSION POWER GENERATION AND HYDROCARBON RECOVERY SYSTEMS AND METHODS

(75) Inventors: Frank Hershkowitz, Bernards Township, NJ (US); Eric D. Nelson, Stavanger (NO); Patrick D. McMahon, The Woodlands, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 192 days.

(21) Appl. No.: 12/919,699

(22) PCT Filed: Mar. 27, 2009

(86) PCT No.: PCT/US2009/038645
§ 371 (c)(1),
(2), (4) Date: Aug. 26, 2010

(87) PCT Pub. No.: WO2009/121008
PCT Pub. Date: Oct. 1, 2009

(65) Prior Publication Data
US 2011/0000671 A1  Jan. 6, 2011

Related U.S. Application Data

(60) Provisional application No. 61/072,292, filed on Mar. 28, 2008, provisional application No. 61/153,508, filed on Feb. 18, 2009, provisional application No. 61/154,675, filed on Feb. 23, 2009.

(51) Int. Cl.
*E21B 43/16* (2006.01)
*B01J 8/00* (2006.01)
*B01J 10/00* (2006.01)

(52) U.S. Cl.
USPC .............. 48/61; 422/625; 422/626; 166/402

(58) Field of Classification Search
USPC ........................ 48/61; 422/625, 626
See application file for complete search history.

(56) References Cited

U.S. PATENT DOCUMENTS 2,324,172 A * 7/1943 Parkhurst ................. 166/266
2,488,911 A   11/1949 Hepburn et al.
(Continued)

FOREIGN PATENT DOCUMENTS

CA   2231749   9/1998
CA   2645450   9/2007
(Continued)

OTHER PUBLICATIONS

BP and Edison Mission Group Plan Major Hydrogen Power Project for California, BP Press Release, Feb. 10, 2006, www.bn.com/hydrogenpower.

(Continued)

*Primary Examiner* — Matthew Merkling
(74) *Attorney, Agent, or Firm* — ExxonMobil Upstream Research Company Law Department

(57) ABSTRACT

Methods and systems for low emission power generation in hydrocarbon recovery processes are provided. One system includes integrated pressure maintenance and miscible flood systems with low emission power generation. The system may also include integration of a pressure swing reformer (PSR), air-blown auto-thermal reformer (ATR), or oxygen-blown ATR with a gas power turbine system, preferably a combined cycle gas power turbine system. Such systems may be employed to capture and utilize greenhouse gases (GHG) and generate power for use in hydrocarbon recovery operations.

8 Claims, 9 Drawing Sheets

(56) References Cited

U.S. PATENT DOCUMENTS

| | | | |
|---|---|---|---|
| 2,884,758 A | 5/1959 | Arthur |
| 3,631,672 A | 1/1972 | Gentile et al. |
| 3,643,430 A | 2/1972 | Emory et al. |
| 3,705,492 A | 12/1972 | Vickers |
| 3,841,382 A | 10/1974 | Gravis, III et al. |
| 3,949,548 A | 4/1976 | Lockwood, Jr. |
| 4,018,046 A | 4/1977 | Hurley |
| 4,043,395 A | 8/1977 | Every et al. |
| 4,050,239 A | 9/1977 | Kappler et al. |
| 4,066,214 A | 1/1978 | Johnson |
| 4,077,206 A | 3/1978 | Ayyagari |
| 4,085,578 A | 4/1978 | Kydd |
| 4,092,095 A | 5/1978 | Straitz, III |
| 4,101,294 A | 7/1978 | Kimura |
| 4,112,676 A | 9/1978 | DeCorso |
| 4,117,671 A | 10/1978 | Neal et al. |
| 4,160,640 A | 7/1979 | Maev et al. |
| 4,165,609 A | 8/1979 | Rudolph |
| 4,171,349 A | 10/1979 | Cucuiat et al. |
| 4,204,401 A | 5/1980 | Earnest |
| 4,222,240 A | 9/1980 | Castellano |
| 4,224,991 A | 9/1980 | Sowa et al. |
| 4,236,378 A | 12/1980 | Vogt |
| 4,253,301 A | 3/1981 | Vogt |
| 4,271,664 A | 6/1981 | Earnest |
| 4,344,486 A | 8/1982 | Parrish |
| 4,345,426 A | 8/1982 | Egnell et al. |
| 4,352,269 A | 10/1982 | Dineen |
| 4,380,895 A | 4/1983 | Adkins |
| 4,399,652 A | 8/1983 | Cole et al. |
| 4,414,334 A | 11/1983 | Hitzman |
| 4,434,613 A | 3/1984 | Stahl |
| 4,435,153 A | 3/1984 | Hashimoto et al. |
| 4,442,665 A | 4/1984 | Fick et al. |
| 4,445,842 A | 5/1984 | Syska |
| 4,479,484 A | 10/1984 | Davis |
| 4,480,985 A | 11/1984 | Davis |
| 4,488,865 A | 12/1984 | Davis |
| 4,498,288 A | 2/1985 | Vogt |
| 4,498,289 A | 2/1985 | Osgerby |
| 4,528,811 A | 7/1985 | Stahl |
| 4,543,784 A | 10/1985 | Kirker |
| 4,548,034 A | 10/1985 | Maguire |
| 4,561,245 A | 12/1985 | Ball |
| 4,569,310 A | 2/1986 | Davis |
| 4,577,462 A | 3/1986 | Robertson |
| 4,602,614 A | 7/1986 | Percival et al. |
| 4,606,721 A | 8/1986 | Livingston |
| 4,613,299 A | 9/1986 | Backheim |
| 4,637,792 A | 1/1987 | Davis |
| 4,651,712 A | 3/1987 | Davis |
| 4,653,278 A | 3/1987 | Vinson et al. |
| 4,681,678 A | 7/1987 | Leaseburge et al. |
| 4,684,465 A | 8/1987 | Leaseburge et al. |
| 4,753,666 A | 6/1988 | Pastor et al. |
| 4,762,543 A | 8/1988 | Pantermuehl et al. |
| 4,817,387 A | 4/1989 | Lashbrook |
| 4,858,428 A | 8/1989 | Paul |
| 4,895,710 A | 1/1990 | Hartmann et al. |
| 4,898,001 A | 2/1990 | Kuroda et al. |
| 4,976,100 A | 12/1990 | Lee |
| 5,014,785 A | 5/1991 | Puri et al. |
| 5,044,932 A | 9/1991 | Martin et al. |
| 5,073,105 A | 12/1991 | Martin et al. |
| 5,084,438 A | 1/1992 | Matsubara et al. |
| 5,085,274 A | 2/1992 | Puri et al. |
| 5,098,282 A | 3/1992 | Schwartz et al. |
| 5,123,248 A | 6/1992 | Monty et al. |
| 5,135,387 A | 8/1992 | Martin et al. |
| 5,141,049 A | 8/1992 | Larsen et al. |
| 5,142,866 A | 9/1992 | Yanagihara et al. |
| 5,147,111 A | 9/1992 | Montgomery |
| 5,154,596 A | 10/1992 | Schwartz et al. |
| 5,183,232 A | 2/1993 | Gale |
| 5,195,884 A | 3/1993 | Schwartz et al. |
| 5,197,289 A | 3/1993 | Glevicky et al. |
| 5,238,395 A | 8/1993 | Schwartz et al. |
| 5,255,506 A | 10/1993 | Wilkes et al. |
| 5,265,410 A | 11/1993 | Hisatome |
| 5,271,905 A | 12/1993 | Owen et al. |
| 5,275,552 A | 1/1994 | Schwartz et al. |
| 5,304,362 A | 4/1994 | Madsen |
| 5,325,660 A | 7/1994 | Taniguchi et al. |
| 5,332,036 A | 7/1994 | Shirley et al. |
| 5,344,307 A | 9/1994 | Schwartz et al. |
| 5,345,756 A | 9/1994 | Jahnke et al. |
| 5,359,847 A | 11/1994 | Pillsbury et al. |
| 5,361,586 A | 11/1994 | McWhirter et al. |
| 5,388,395 A | 2/1995 | Scharpf et al. |
| 5,394,688 A | 3/1995 | Amos |
| 5,402,847 A | 4/1995 | Wilson et al. |
| 5,444,971 A | 8/1995 | Holenberger |
| 5,458,481 A | 10/1995 | Surbey et al. |
| 5,468,270 A | 11/1995 | Borszynski |
| 5,490,378 A | 2/1996 | Berger et al. |
| 5,542,840 A | 8/1996 | Surbey et al. |
| 5,566,756 A | 10/1996 | Chaback et al. |
| 5,572,862 A | 11/1996 | Mowill |
| 5,581,998 A | 12/1996 | Craig |
| 5,584,182 A | 12/1996 | Althaus et al. |
| 5,590,518 A | 1/1997 | Janes |
| 5,628,182 A | 5/1997 | Mowill |
| 5,634,329 A | 6/1997 | Andersson et al. |
| 5,638,675 A | 6/1997 | Zysman et al. |
| 5,640,840 A | 6/1997 | Briesch |
| 5,657,631 A | 8/1997 | Androsov |
| 5,680,764 A | 10/1997 | Viteri |
| 5,685,158 A | 11/1997 | Lenahan et al. |
| 5,709,077 A | 1/1998 | Beichel |
| 5,713,206 A | 2/1998 | McWhirter et al. |
| 5,715,673 A | 2/1998 | Beichel |
| 5,724,805 A | 3/1998 | Golomb et al. |
| 5,725,054 A | 3/1998 | Shayegi et al. |
| 5,740,786 A | 4/1998 | Gartner |
| 5,743,079 A | 4/1998 | Walsh et al. |
| 5,765,363 A | 6/1998 | Mowill |
| 5,771,867 A | 6/1998 | Amstutz et al. |
| 5,771,868 A | 6/1998 | Khair |
| 5,819,540 A | 10/1998 | Massarani |
| 5,832,712 A | 11/1998 | Ronning et al. |
| 5,836,164 A | 11/1998 | Tsukahara et al. |
| 5,839,283 A | 11/1998 | Dobbeling |
| 5,850,732 A | 12/1998 | Willis et al. |
| 5,894,720 A | 4/1999 | Willis et al. |
| 5,901,547 A | 5/1999 | Smith et al. |
| 5,924,275 A | 7/1999 | Cohen et al. |
| 5,930,990 A | 8/1999 | Zachary et al. |
| 5,937,634 A | 8/1999 | Etheridge et al. |
| 5,950,417 A | 9/1999 | Robertson, Jr. et al. |
| 5,956,937 A | 9/1999 | Beichel |
| 5,968,349 A | 10/1999 | Duyvesteyn et al. |
| 5,974,780 A | 11/1999 | Santos |
| 5,992,388 A | 11/1999 | Seger |
| 6,016,658 A | 1/2000 | Willis et al. |
| 6,032,465 A | 3/2000 | Regnier |
| 6,035,641 A | 3/2000 | Lokhandwala |
| 6,062,026 A | 5/2000 | Woollenweber et al. |
| 6,079,974 A | 6/2000 | Thompson |
| 6,082,093 A | 7/2000 | Greenwood et al. |
| 6,089,855 A | 7/2000 | Becker et al. |
| 6,094,916 A | 8/2000 | Puri et al. |
| 6,101,983 A | 8/2000 | Anand et al. |
| 6,148,602 A | 11/2000 | Demetri |
| 6,170,264 B1 | 1/2001 | Viteri et al. |
| 6,183,241 B1 | 2/2001 | Bohn et al. |
| 6,201,029 B1 | 3/2001 | Waycuilis |
| 6,202,400 B1 | 3/2001 | Utamura et al. |
| 6,202,442 B1 | 3/2001 | Brugerolle |
| 6,202,574 B1 | 3/2001 | Liljedahl et al. |
| 6,209,325 B1 | 4/2001 | Alkabie |
| 6,216,459 B1 | 4/2001 | Daudel et al. |
| 6,216,549 B1 | 4/2001 | Davis et al. |
| 6,230,103 B1 | 5/2001 | DeCorso et al. |
| 6,237,339 B1 | 5/2001 | Åsen et al. |

(56) References Cited

U.S. PATENT DOCUMENTS

| | | |
|---|---|---|
| 6,247,315 B1 | 6/2001 | Marin et al. |
| 6,247,316 B1 | 6/2001 | Viteri |
| 6,248,794 B1 | 6/2001 | Gieskes |
| 6,253,555 B1 | 7/2001 | Willis |
| 6,256,976 B1 | 7/2001 | Kataoka et al. |
| 6,256,994 B1 | 7/2001 | Dillon, IV |
| 6,263,659 B1 | 7/2001 | Dillon, IV et al. |
| 6,266,954 B1 | 7/2001 | McCallum et al. |
| 6,269,882 B1 | 8/2001 | Wellington et al. |
| 6,276,171 B1 | 8/2001 | Brugerolle |
| 6,282,901 B1 | 9/2001 | Marin et al. |
| 6,283,087 B1 | 9/2001 | Isaksen |
| 6,289,677 B1 | 9/2001 | Prociw et al. |
| 6,298,652 B1 | 10/2001 | Mittricker et al. |
| 6,298,654 B1 | 10/2001 | Vermes et al. |
| 6,298,664 B1 | 10/2001 | Åsen et al. |
| 6,301,888 B1 | 10/2001 | Gray, Jr. |
| 6,301,889 B1 | 10/2001 | Gladden et al. |
| 6,305,929 B1 | 10/2001 | Chung et al. |
| 6,314,721 B1 | 11/2001 | Mathews et al. |
| 6,332,313 B1 | 12/2001 | Willis et al. |
| 6,345,493 B1 | 2/2002 | Smith et al. |
| 6,360,528 B1 | 3/2002 | Brausch et al. |
| 6,363,709 B2 | 4/2002 | Kataoka et al. |
| 6,370,870 B1 | 4/2002 | Kamijo et al. |
| 6,374,594 B1 | 4/2002 | Kraft et al. |
| 6,383,461 B1 | 5/2002 | Lang |
| 6,389,814 B2 | 5/2002 | Viteri et al. |
| 6,405,536 B1 | 6/2002 | Ho et al. |
| 6,412,278 B1 | 7/2002 | Matthews |
| 6,412,559 B1 | 7/2002 | Gunter et al. |
| 6,418,725 B1 | 7/2002 | Maeda et al. |
| 6,429,020 B1 | 8/2002 | Thornton et al. |
| 6,449,954 B2 | 9/2002 | Bachmann |
| 6,450,256 B2 | 9/2002 | Mones |
| 6,461,147 B1 | 10/2002 | Sonju et al. |
| 6,467,270 B2 | 10/2002 | Mulloy et al. |
| 6,470,682 B2 | 10/2002 | Gray, Jr. |
| 6,477,859 B2 | 11/2002 | Wong et al. |
| 6,484,503 B1 | 11/2002 | Raz |
| 6,484,507 B1 | 11/2002 | Pradt |
| 6,487,863 B1 | 12/2002 | Chen et al. |
| 6,499,990 B1 | 12/2002 | Zink et al. |
| 6,502,383 B1 | 1/2003 | Janardan et al. |
| 6,505,567 B1 | 1/2003 | Anderson et al. |
| 6,505,683 B2 | 1/2003 | Minkkinen et al. |
| 6,508,209 B1 | 1/2003 | Collier, Jr. |
| 6,523,349 B2 | 2/2003 | Viteri |
| 6,532,745 B1 | 3/2003 | Neary |
| 6,539,716 B2 | 4/2003 | Finger et al. |
| 6,584,775 B1 | 7/2003 | Schneider et al. |
| 6,598,398 B2 | 7/2003 | Viteri et al. |
| 6,598,399 B2 | 7/2003 | Liebig |
| 6,598,402 B2 | 7/2003 | Kataoka et al. |
| 6,606,861 B2 | 8/2003 | Snyder |
| 6,612,291 B2 | 9/2003 | Sakamoto |
| 6,615,576 B2 | 9/2003 | Sheoran et al. |
| 6,615,589 B2 | 9/2003 | Allam et al. |
| 6,622,470 B2 | 9/2003 | Viteri et al. |
| 6,622,645 B2 | 9/2003 | Havlena |
| 6,637,183 B2 | 10/2003 | Viteri et al. |
| 6,655,150 B1 | 12/2003 | Åsen et al. |
| 6,668,541 B2 | 12/2003 | Rice et al. |
| 6,672,863 B2 | 1/2004 | Doebbeling et al. |
| 6,675,579 B1 | 1/2004 | Yang |
| 6,684,643 B2 | 2/2004 | Frutschi |
| 6,694,735 B2 | 2/2004 | Sumser et al. |
| 6,698,412 B2 | 3/2004 | Dalla Betta |
| 6,702,570 B2 | 3/2004 | Shah et al. |
| 6,722,436 B2 | 4/2004 | Krill |
| 6,725,665 B2 | 4/2004 | Tuschy et al. |
| 6,731,501 B1 | 5/2004 | Cheng |
| 6,732,531 B2 | 5/2004 | Dickey |
| 6,742,506 B1 | 6/2004 | Grandin |
| 6,743,829 B2 | 6/2004 | Fischer-Calderon et al. |
| 6,745,573 B2 | 6/2004 | Marin et al. |
| 6,745,624 B2 | 6/2004 | Porter et al. |
| 6,748,004 B2 | 6/2004 | Jepson |
| 6,752,620 B2 | 6/2004 | Heier et al. |
| 6,767,527 B1 | 7/2004 | Åsen et al. |
| 6,772,583 B2 | 8/2004 | Bland |
| 6,790,030 B2 | 9/2004 | Fischer et al. |
| 6,805,483 B2 | 10/2004 | Tomlinson et al. |
| 6,810,673 B2 | 11/2004 | Snyder |
| 6,813,889 B2 | 11/2004 | Inoue et al. |
| 6,817,187 B2 | 11/2004 | Yu |
| 6,820,428 B2 | 11/2004 | Wylie |
| 6,821,501 B2 | 11/2004 | Matzakos et al. |
| 6,823,852 B2 | 11/2004 | Collier, Jr. |
| 6,824,710 B2 | 11/2004 | Viteri et al. |
| 6,826,912 B2 | 12/2004 | Levy et al. |
| 6,826,913 B2 | 12/2004 | Wright |
| 6,838,071 B1 | 1/2005 | Olsvik et al. |
| 6,851,413 B1 | 2/2005 | Tamol, Sr. |
| 6,868,677 B2 | 3/2005 | Viteri et al. |
| 6,886,334 B2 | 5/2005 | Shirakawa |
| 6,887,069 B1 | 5/2005 | Thornton et al. |
| 6,899,859 B1 | 5/2005 | Olsvik |
| 6,901,760 B2 | 6/2005 | Dittmann et al. |
| 6,904,815 B2 | 6/2005 | Widmer |
| 6,907,737 B2 | 6/2005 | Mittricker et al. |
| 6,910,335 B2 | 6/2005 | Viteri et al. |
| 6,923,915 B2 | 8/2005 | Alford et al. |
| 6,939,130 B2 | 9/2005 | Abbasi et al. |
| 6,945,029 B2 | 9/2005 | Viteri |
| 6,945,052 B2 | 9/2005 | Frutschi et al. |
| 6,945,087 B2 | 9/2005 | Porter et al. |
| 6,945,089 B2 | 9/2005 | Barie et al. |
| 6,946,419 B2 | 9/2005 | Kaefer |
| 6,969,123 B2 | 11/2005 | Vinegar et al. |
| 6,971,242 B2 | 12/2005 | Boardman |
| 6,981,358 B2 | 1/2006 | Bellucci et al. |
| 6,988,549 B1 | 1/2006 | Babcock |
| 6,993,901 B2 | 2/2006 | Shirakawa |
| 6,993,916 B2 | 2/2006 | Johnson et al. |
| 6,994,491 B2 | 2/2006 | Kittle |
| 7,007,487 B2 | 3/2006 | Belokon et al. |
| 7,010,921 B2 | 3/2006 | Intile et al. |
| 7,011,154 B2 | 3/2006 | Maher et al. |
| 7,015,271 B2 | 3/2006 | Bice et al. |
| 7,032,388 B2 | 4/2006 | Healy |
| 7,040,400 B2 | 5/2006 | de Rouffignac et al. |
| 7,043,898 B2 | 5/2006 | Rago |
| 7,043,920 B2 | 5/2006 | Viteri et al. |
| 7,056,482 B2 | 6/2006 | Hakka et al. |
| 7,059,152 B2 | 6/2006 | Oakey et al. |
| 7,065,953 B1 | 6/2006 | Kopko |
| 7,065,972 B2 | 6/2006 | Zupanc et al. |
| 7,074,033 B2 | 7/2006 | Neary |
| 7,077,199 B2 | 7/2006 | Vinegar et al. |
| 7,089,743 B2 | 8/2006 | Frutschi et al. |
| 7,096,942 B1 | 8/2006 | de Rouffignac et al. |
| 7,097,925 B2 | 8/2006 | Keefer |
| 7,104,319 B2 | 9/2006 | Vinegar et al. |
| 7,104,784 B1 | 9/2006 | Hasegawa et al. |
| 7,124,589 B2 | 10/2006 | Neary |
| 7,137,256 B1 | 11/2006 | Stuttaford et al. |
| 7,143,572 B2 | 12/2006 | Ooka et al. |
| 7,143,606 B2 | 12/2006 | Tranier |
| 7,146,969 B2 | 12/2006 | Weirich |
| 7,147,461 B2 | 12/2006 | Neary |
| 7,152,409 B2 | 12/2006 | Yee et al. |
| 7,162,875 B2 | 1/2007 | Fletcher et al. |
| 7,168,265 B2 | 1/2007 | Briscoe et al. |
| 7,168,488 B2 | 1/2007 | Olsvik et al. |
| 7,185,497 B2 | 3/2007 | Dudebout et al. |
| 7,194,869 B2 | 3/2007 | McQuiggan et al. |
| 7,197,880 B2 | 4/2007 | Thornton et al. |
| 7,225,623 B2 | 6/2007 | Koshoffer |
| 7,237,385 B2 | 7/2007 | Carrea |
| 7,284,362 B2 | 10/2007 | Marin et al. |
| 7,299,868 B2 | 11/2007 | Zapadinski |
| 7,302,801 B2 | 12/2007 | Chen |
| 7,305,817 B2 | 12/2007 | Blodgett et al. |

(56) References Cited

U.S. PATENT DOCUMENTS

| | | |
|---|---|---|
| 7,305,831 B2 | 12/2007 | Carrea et al. |
| 7,313,916 B2 | 1/2008 | Pellizzari |
| 7,318,317 B2 | 1/2008 | Carrea |
| 7,343,742 B2 | 3/2008 | Wimmer et al. |
| 7,353,655 B2 | 4/2008 | Bolis et al. |
| 7,357,857 B2 | 4/2008 | Hart et al. |
| 7,363,756 B2 | 4/2008 | Carrea et al. |
| 7,363,764 B2 | 4/2008 | Griffin et al. |
| 7,381,393 B2 | 6/2008 | Lynn |
| 7,401,577 B2 | 7/2008 | Saucedo et al. |
| 7,410,525 B1 | 8/2008 | Liu et al. |
| 7,416,137 B2 | 8/2008 | Hagen et al. |
| 7,434,384 B2 | 10/2008 | Lord et al. |
| 7,438,744 B2 | 10/2008 | Beaumont |
| 7,467,942 B2 | 12/2008 | Carroni et al. |
| 7,472,550 B2 | 1/2009 | Lear, Jr. et al. |
| 7,481,048 B2 | 1/2009 | Harmon et al. |
| 7,481,275 B2 | 1/2009 | Olsvik et al. |
| 7,482,500 B2 | 1/2009 | Johann et al. |
| 7,485,761 B2 | 2/2009 | Schindler et al. |
| 7,488,857 B2 | 2/2009 | Johann et al. |
| 7,490,472 B2 | 2/2009 | Lynghjem et al. |
| 7,491,250 B2 | 2/2009 | Hershkowitz et al. |
| 7,492,054 B2 | 2/2009 | Catlin |
| 7,493,769 B2 | 2/2009 | Jangili |
| 7,498,009 B2 | 3/2009 | Leach et al. |
| 7,503,178 B2 | 3/2009 | Bucker et al. |
| 7,506,501 B2 | 3/2009 | Anderson et al. |
| 7,513,099 B2 | 4/2009 | Nuding et al. |
| 7,513,100 B2 | 4/2009 | Motter et al. |
| 7,516,626 B2 | 4/2009 | Brox et al. |
| 7,520,134 B2 | 4/2009 | Durbin et al. |
| 7,523,603 B2 | 4/2009 | Hagen et al. |
| 7,536,252 B1 | 5/2009 | Hibshman, II et al. |
| 7,536,873 B2 | 5/2009 | Nohlen |
| 7,540,150 B2 | 6/2009 | Schmid et al. |
| 7,559,977 B2 | 7/2009 | Fleischer et al. |
| 7,562,519 B1 | 7/2009 | Harris et al. |
| 7,562,529 B2 | 7/2009 | Kuspert et al. |
| 7,566,394 B2 | 7/2009 | Koseoglu |
| 7,591,866 B2 | 9/2009 | Bose |
| 7,594,386 B2 | 9/2009 | Narayanan et al. |
| 7,610,752 B2 | 11/2009 | Dalla Betta et al. |
| 7,610,759 B2 | 11/2009 | Yoshida et al. |
| 7,611,681 B2 | 11/2009 | Kaefer |
| 7,614,352 B2 | 11/2009 | Anthony et al. |
| 7,618,606 B2 | 11/2009 | Fan et al. |
| 7,631,493 B2 | 12/2009 | Shirakawa et al. |
| 7,634,915 B2 | 12/2009 | Hoffmann et al. |
| 7,635,408 B2 | 12/2009 | Mak et al. |
| 7,637,093 B2 | 12/2009 | Rao |
| 7,650,744 B2 | 1/2010 | Varatharajan et al. |
| 7,654,320 B2 | 2/2010 | Payton |
| 7,654,330 B2 | 2/2010 | Zubrin et al. |
| 7,655,071 B2 | 2/2010 | De Vreede |
| 7,670,135 B1 | 3/2010 | Zink et al. |
| 7,673,454 B2 | 3/2010 | Saito et al. |
| 7,674,443 B1 | 3/2010 | Davis |
| 7,677,309 B2 | 3/2010 | Shaw et al. |
| 7,681,394 B2 | 3/2010 | Haugen |
| 7,682,597 B2 | 3/2010 | Blumenfeld et al. |
| 7,690,204 B2 | 4/2010 | Drnevich et al. |
| 7,691,788 B2 | 4/2010 | Tan et al. |
| 7,695,703 B2 | 4/2010 | Sobolevskiy et al. |
| 7,717,173 B2 | 5/2010 | Grott |
| 7,721,543 B2 | 5/2010 | Massey et al. |
| 7,726,114 B2 | 6/2010 | Evulet |
| 7,734,408 B2 | 6/2010 | Shiraki |
| 7,739,864 B2 | 6/2010 | Finkenrath et al. |
| 7,749,311 B2 | 7/2010 | Saito et al. |
| 7,752,848 B2 | 7/2010 | Balan et al. |
| 7,752,850 B2 | 7/2010 | Laster et al. |
| 7,753,039 B2 | 7/2010 | Harima et al. |
| 7,753,972 B2 | 7/2010 | Zubrin et al. |
| 7,762,084 B2 | 7/2010 | Martis et al. |
| 7,763,163 B2 | 7/2010 | Koseoglu |
| 7,763,227 B2 | 7/2010 | Wang |
| 7,765,810 B2 | 8/2010 | Pfefferle |
| 7,788,897 B2 | 9/2010 | Campbell et al. |
| 7,789,159 B1 | 9/2010 | Bader |
| 7,789,658 B2 | 9/2010 | Towler et al. |
| 7,789,944 B2 | 9/2010 | Saito et al. |
| 7,793,494 B2 | 9/2010 | Wirth et al. |
| 7,802,434 B2 | 9/2010 | Varatharajan et al. |
| 7,819,951 B2 | 10/2010 | White et al. |
| 7,824,179 B2 | 11/2010 | Hasegawa et al. |
| 7,827,778 B2 | 11/2010 | Finkenrath et al. |
| 7,827,794 B1 | 11/2010 | Pronske et al. |
| 7,841,186 B2 | 11/2010 | So et al. |
| 7,845,406 B2 | 12/2010 | Nitschke |
| 7,861,511 B2 | 1/2011 | Chillar et al. |
| 7,874,140 B2 | 1/2011 | Fan et al. |
| 7,874,350 B2 | 1/2011 | Pfefferle |
| 7,882,692 B2 | 2/2011 | Pronske et al. |
| 7,886,522 B2 | 2/2011 | Kammel |
| 7,895,822 B2 | 3/2011 | Hoffmann et al. |
| 7,896,105 B2 | 3/2011 | Dupriest |
| 7,906,304 B2 | 3/2011 | Kohr |
| 7,909,898 B2 | 3/2011 | White et al. |
| 7,914,749 B2 | 3/2011 | Carstens et al. |
| 7,918,906 B2 | 4/2011 | Zubrin et al. |
| 7,921,633 B2 | 4/2011 | Rising |
| 7,922,871 B2 | 4/2011 | Price et al. |
| 7,926,292 B2 | 4/2011 | Rabovitser et al. |
| 7,931,712 B2 | 4/2011 | Zubrin et al. |
| 7,931,731 B2 | 4/2011 | Van Heeringen et al. |
| 7,931,888 B2 | 4/2011 | Drnevich et al. |
| 7,934,926 B2 | 5/2011 | Kornbluth et al. |
| 7,942,003 B2 | 5/2011 | Baudoin et al. |
| 7,942,008 B2 | 5/2011 | Joshi et al. |
| 7,943,097 B2 | 5/2011 | Golden et al. |
| 7,955,403 B2 | 6/2011 | Ariyapadi et al. |
| 7,966,822 B2 | 6/2011 | Myers et al. |
| 7,976,803 B2 | 7/2011 | Hooper et al. |
| 7,980,312 B1 | 7/2011 | Hill et al. |
| 7,985,399 B2 | 7/2011 | Drnevich et al. |
| 8,001,789 B2 | 8/2011 | Vega et al. |
| 8,029,273 B2 | 10/2011 | Paschereit et al. |
| 8,036,813 B2 | 10/2011 | Tonetti et al. |
| 8,038,416 B2 | 10/2011 | Ono et al. |
| 8,038,746 B2 | 10/2011 | Clark |
| 8,038,773 B2 | 10/2011 | Ochs et al. |
| 8,046,986 B2 | 11/2011 | Chillar et al. |
| 8,047,007 B2 | 11/2011 | Zubrin et al. |
| 8,051,638 B2 | 11/2011 | Aljabari et al. |
| 8,061,120 B2 | 11/2011 | Hwang |
| 8,062,617 B2 | 11/2011 | Stakhev et al. |
| 8,065,870 B2 | 11/2011 | Jobson et al. |
| 8,065,874 B2 | 11/2011 | Fong et al. |
| 8,074,439 B2 | 12/2011 | Foret |
| 8,080,225 B2 | 12/2011 | Dickinson et al. |
| 8,083,474 B2 | 12/2011 | Hashimoto et al. |
| 8,097,230 B2 | 1/2012 | Mesters et al. |
| 8,101,146 B2 | 1/2012 | Fedeyko et al. |
| 8,105,559 B2 | 1/2012 | Melville et al. |
| 8,110,012 B2 | 2/2012 | Chiu et al. |
| 8,117,825 B2 | 2/2012 | Griffin et al. |
| 8,117,846 B2 | 2/2012 | Wilbraham |
| 8,127,558 B2 | 3/2012 | Bland et al. |
| 8,127,936 B2 | 3/2012 | Liu et al. |
| 8,127,937 B2 | 3/2012 | Liu et al. |
| 8,133,298 B2 | 3/2012 | Lanyi et al. |
| 8,166,766 B2 | 5/2012 | Draper |
| 8,167,960 B2 | 5/2012 | Gil |
| 8,176,982 B2 | 5/2012 | Gil et al. |
| 8,191,360 B2 | 6/2012 | Fong et al. |
| 8,191,361 B2 | 6/2012 | Fong et al. |
| 8,196,387 B2 | 6/2012 | Shah et al. |
| 8,201,402 B2 | 6/2012 | Fong et al. |
| 8,205,455 B2 | 6/2012 | Popovic |
| 8,206,669 B2 | 6/2012 | Schaffer et al. |
| 8,209,192 B2 | 6/2012 | Gil et al. |
| 8,215,105 B2 | 7/2012 | Fong et al. |
| 8,220,247 B2 | 7/2012 | Wijmans et al. |

(56) References Cited

U.S. PATENT DOCUMENTS

| | | |
|---|---|---|
| 8,220,248 B2 | 7/2012 | Wijmans et al. |
| 8,220,268 B2 | 7/2012 | Callas |
| 8,225,600 B2 | 7/2012 | Theis |
| 8,226,912 B2 | 7/2012 | Kloosterman et al. |
| 8,240,142 B2 | 8/2012 | Fong et al. |
| 8,240,153 B2 | 8/2012 | Childers et al. |
| 8,245,492 B2 | 8/2012 | Draper |
| 8,245,493 B2 | 8/2012 | Minto |
| 8,247,462 B2 | 8/2012 | Boshoff et al. |
| 8,257,476 B2 | 9/2012 | White et al. |
| 8,261,823 B1 | 9/2012 | Hill et al. |
| 8,262,343 B2 | 9/2012 | Hagen |
| 8,266,883 B2 | 9/2012 | Dion Ouellet et al. |
| 8,266,913 B2 | 9/2012 | Snook et al. |
| 8,268,044 B2 | 9/2012 | Wright et al. |
| 8,281,596 B1 | 10/2012 | Rohrssen et al. |
| 8,316,784 B2 | 11/2012 | D'Agostini |
| 8,337,613 B2 | 12/2012 | Zauderer |
| 8,347,600 B2 | 1/2013 | Wichmann et al. |
| 8,348,551 B2 | 1/2013 | Baker et al. |
| 8,371,100 B2 | 2/2013 | Draper |
| 8,372,251 B2 | 2/2013 | Goller et al. |
| 8,377,184 B2 | 2/2013 | Fujikawa et al. |
| 8,377,401 B2 | 2/2013 | Darde et al. |
| 8,388,919 B2 | 3/2013 | Hooper et al. |
| 8,397,482 B2 | 3/2013 | Kraemer et al. |
| 8,398,757 B2 | 3/2013 | Iijima et al. |
| 8,409,307 B2 | 4/2013 | Drnevich et al. |
| 8,414,694 B2 | 4/2013 | Iijima et al. |
| 8,424,282 B2 | 4/2013 | Vollmer et al. |
| 8,424,601 B2 | 4/2013 | Betzer-Zilevitch |
| 8,436,489 B2 | 5/2013 | Stahlkopf et al. |
| 8,453,461 B2 | 6/2013 | Draper |
| 8,453,462 B2 | 6/2013 | Wichmann et al. |
| 8,453,583 B2 | 6/2013 | Malavasi et al. |
| 8,454,350 B2 | 6/2013 | Berry et al. |
| 8,475,160 B2 | 7/2013 | Campbell et al. |
| 8,539,749 B1 | 9/2013 | Wichmann et al. |
| 8,567,200 B2 | 10/2013 | Brook et al. |
| 8,616,294 B2 | 12/2013 | Zubrin et al. |
| 8,627,643 B2 | 1/2014 | Chillar et al. |
| 2001/0000049 A1 | 3/2001 | Kataoka et al. |
| 2001/0029732 A1 | 10/2001 | Bachmann |
| 2001/0045090 A1 | 11/2001 | Gray, Jr. |
| 2002/0043063 A1 | 4/2002 | Kataoka et al. |
| 2002/0053207 A1 | 5/2002 | Finger et al. |
| 2002/0069648 A1 | 6/2002 | Levy et al. |
| 2002/0187449 A1 | 12/2002 | Doebbeling et al. |
| 2003/0131582 A1 | 7/2003 | Anderson et al. |
| 2003/0134241 A1 | 7/2003 | Marin et al. |
| 2003/0168211 A1 * | 9/2003 | Arnaud et al. .................. 166/68 |
| 2003/0221409 A1 | 12/2003 | McGowan |
| 2003/0235529 A1 | 12/2003 | Hershkowitz et al. |
| 2004/0006994 A1 | 1/2004 | Walsh et al. |
| 2004/0068981 A1 | 4/2004 | Siefker et al. |
| 2004/0166034 A1 | 8/2004 | Kaefer |
| 2004/0170558 A1 | 9/2004 | Hershkowitz |
| 2004/0170559 A1 | 9/2004 | Hershkowitz et al. |
| 2004/0175326 A1 | 9/2004 | Hershkowitz et al. |
| 2004/0180973 A1 | 9/2004 | Hershkowitz |
| 2004/0191166 A1 | 9/2004 | Hershkowitz et al. |
| 2004/0223408 A1 | 11/2004 | Mathys et al. |
| 2004/0238654 A1 | 12/2004 | Hagen et al. |
| 2004/0241505 A1 | 12/2004 | Hershkowitz et al. |
| 2005/0028529 A1 | 2/2005 | Bartlett et al. |
| 2005/0137269 A1 | 6/2005 | Hershkowitz et al. |
| 2005/0144961 A1 | 7/2005 | Colibaba-Evulet et al. |
| 2005/0154068 A1 | 7/2005 | Hershkowitz et al. |
| 2005/0186130 A1 | 8/2005 | Hughes et al. |
| 2005/0197267 A1 | 9/2005 | Zaki et al. |
| 2005/0201929 A1 | 9/2005 | Hershkowitz et al. |
| 2005/0229585 A1 | 10/2005 | Webster |
| 2005/0236602 A1 | 10/2005 | Viteri et al. |
| 2006/0112675 A1 | 6/2006 | Anderson et al. |
| 2006/0158961 A1 | 7/2006 | Ruscheweyh et al. |
| 2006/0183009 A1 | 8/2006 | Berlowitz et al. |
| 2006/0188760 A1 | 8/2006 | Hershkowitz et al. |
| 2006/0196812 A1 | 9/2006 | Beetge et al. |
| 2006/0231252 A1 | 10/2006 | Shaw et al. |
| 2006/0248888 A1 | 11/2006 | Geskes |
| 2007/0000242 A1 | 1/2007 | Harmon et al. |
| 2007/0044475 A1 | 3/2007 | Leser et al. |
| 2007/0044479 A1 | 3/2007 | Brandt et al. |
| 2007/0089425 A1 | 4/2007 | Motter et al. |
| 2007/0107430 A1 | 5/2007 | Schmid et al. |
| 2007/0144747 A1 | 6/2007 | Steinberg |
| 2007/0144940 A1 | 6/2007 | Hershkowitz et al. |
| 2007/0231233 A1 | 10/2007 | Bose |
| 2007/0234702 A1 | 10/2007 | Hagen et al. |
| 2007/0245736 A1 | 10/2007 | Barnicki |
| 2007/0249738 A1 | 10/2007 | Haynes et al. |
| 2007/0272201 A1 | 11/2007 | Amano et al. |
| 2008/0000229 A1 | 1/2008 | Kuspert et al. |
| 2008/0006561 A1 | 1/2008 | Moran et al. |
| 2008/0010967 A1 | 1/2008 | Griffin et al. |
| 2008/0038598 A1 | 2/2008 | Berlowitz et al. |
| 2008/0066443 A1 | 3/2008 | Frutschi et al. |
| 2008/0115478 A1 | 5/2008 | Sullivan |
| 2008/0118310 A1 | 5/2008 | Graham |
| 2008/0127632 A1 | 6/2008 | Finkenrath et al. |
| 2008/0142409 A1 | 6/2008 | Sankaranarayanan et al. |
| 2008/0155984 A1 | 7/2008 | Liu et al. |
| 2008/0202123 A1 | 8/2008 | Sullivan et al. |
| 2008/0223038 A1 | 9/2008 | Lutz et al. |
| 2008/0290719 A1 | 11/2008 | Kaminsky et al. |
| 2008/0309087 A1 | 12/2008 | Evulet et al. |
| 2009/0025390 A1 | 1/2009 | Christensen et al. |
| 2009/0038247 A1 | 2/2009 | Taylor et al. |
| 2009/0056342 A1 | 3/2009 | Kirzhner |
| 2009/0064653 A1 | 3/2009 | Hagen et al. |
| 2009/0071166 A1 | 3/2009 | Hagen et al. |
| 2009/0107141 A1 | 4/2009 | Chillar et al. |
| 2009/0117024 A1 | 5/2009 | Weedon et al. |
| 2009/0120087 A1 | 5/2009 | Sumser et al. |
| 2009/0157230 A1 | 6/2009 | Hibshman, II et al. |
| 2009/0193809 A1 | 8/2009 | Schroder et al. |
| 2009/0205334 A1 | 8/2009 | Aljabari et al. |
| 2009/0218821 A1 | 9/2009 | ElKady et al. |
| 2009/0223227 A1 | 9/2009 | Lipinski et al. |
| 2009/0229263 A1 | 9/2009 | Ouellet et al. |
| 2009/0235637 A1 | 9/2009 | Foret |
| 2009/0241506 A1 | 10/2009 | Nilsson |
| 2009/0255242 A1 | 10/2009 | Paterson et al. |
| 2009/0262599 A1 | 10/2009 | Kohrs et al. |
| 2009/0284013 A1 | 11/2009 | Anand et al. |
| 2009/0301054 A1 | 12/2009 | Simpson et al. |
| 2009/0301099 A1 | 12/2009 | Nigro |
| 2010/0003123 A1 | 1/2010 | Smith |
| 2010/0018218 A1 | 1/2010 | Riley et al. |
| 2010/0058732 A1 | 3/2010 | Kaufmann et al. |
| 2010/0115960 A1 | 5/2010 | Brautsch et al. |
| 2010/0126176 A1 | 5/2010 | Kim |
| 2010/0126906 A1 | 5/2010 | Sury |
| 2010/0162703 A1 | 7/2010 | Li et al. |
| 2010/0170253 A1 | 7/2010 | Berry et al. |
| 2010/0180565 A1 | 7/2010 | Draper |
| 2010/0300102 A1 | 12/2010 | Bathina et al. |
| 2010/0310439 A1 | 12/2010 | Brok et al. |
| 2010/0322759 A1 | 12/2010 | Tanioka |
| 2010/0326084 A1 | 12/2010 | Anderson et al. |
| 2011/0000221 A1 | 1/2011 | Minta et al. |
| 2011/0000671 A1 | 1/2011 | Hershkowitz et al. |
| 2011/0036082 A1 | 2/2011 | Collinot |
| 2011/0048002 A1 | 3/2011 | Taylor et al. |
| 2011/0048010 A1 | 3/2011 | Balcezak et al. |
| 2011/0072779 A1 | 3/2011 | ELKady et al. |
| 2011/0088379 A1 | 4/2011 | Nanda |
| 2011/0110759 A1 | 5/2011 | Sanchez et al. |
| 2011/0126512 A1 | 6/2011 | Anderson |
| 2011/0138766 A1 | 6/2011 | ELKady et al. |
| 2011/0162353 A1 | 7/2011 | Vanvolsem et al. |
| 2011/0205837 A1 | 8/2011 | Gentgen |
| 2011/0227346 A1 | 9/2011 | Klenven |
| 2011/0232545 A1 | 9/2011 | Clements |

(56) References Cited

U.S. PATENT DOCUMENTS

| | | |
|---|---|---|
| 2011/0239653 A1 | 10/2011 | Valeev et al. |
| 2011/0265447 A1 | 11/2011 | Cunningham |
| 2011/0300493 A1 | 12/2011 | Mittricker et al. |
| 2012/0023954 A1 | 2/2012 | Wichmann |
| 2012/0023955 A1 | 2/2012 | Draper |
| 2012/0023956 A1 | 2/2012 | Popovic |
| 2012/0023957 A1 | 2/2012 | Draper et al. |
| 2012/0023958 A1 | 2/2012 | Snook et al. |
| 2012/0023960 A1 | 2/2012 | Minto |
| 2012/0023962 A1 | 2/2012 | Wichmann et al. |
| 2012/0023963 A1 | 2/2012 | Wichmann et al. |
| 2012/0023966 A1 | 2/2012 | Ouellet et al. |
| 2012/0031581 A1 | 2/2012 | Chillar et al. |
| 2012/0032810 A1 | 2/2012 | Chillar et al. |
| 2012/0085100 A1 | 4/2012 | Hughes et al. |
| 2012/0096870 A1 | 4/2012 | Wichmann et al. |
| 2012/0119512 A1 | 5/2012 | Draper |
| 2012/0131925 A1 | 5/2012 | Mittricker et al. |
| 2012/0144837 A1 | 6/2012 | Rasmussen et al. |
| 2012/0185144 A1 | 7/2012 | Draper |
| 2012/0192565 A1 | 8/2012 | Tretyakov et al. |
| 2012/0247105 A1 | 10/2012 | Nelson et al. |
| 2012/0260660 A1 | 10/2012 | Kraemer et al. |
| 2013/0086916 A1 | 4/2013 | Oelfke et al. |
| 2013/0086917 A1 | 4/2013 | Slobodyanskiy et al. |
| 2013/0091853 A1 | 4/2013 | Denton et al. |
| 2013/0091854 A1 | 4/2013 | Gupta et al. |
| 2013/0104562 A1 | 5/2013 | Oelfke et al. |
| 2013/0104563 A1 | 5/2013 | Oelfke et al. |
| 2013/0125554 A1 | 5/2013 | Mittricker et al. |
| 2013/0125555 A1 | 5/2013 | Mittricker et al. |
| 2013/0232980 A1 | 9/2013 | Chen et al. |
| 2013/0269310 A1 | 10/2013 | Wichmann et al. |
| 2013/0269311 A1 | 10/2013 | Wichmann et al. |
| 2013/0269355 A1 | 10/2013 | Wichmann et al. |
| 2013/0269356 A1 | 10/2013 | Butkiewicz et al. |
| 2013/0269357 A1 | 10/2013 | Wichmann et al. |
| 2013/0269358 A1 | 10/2013 | Wichmann et al. |
| 2013/0269360 A1 | 10/2013 | Wichmann et al. |
| 2013/0269361 A1 | 10/2013 | Wichmann et al. |
| 2013/0269362 A1 | 10/2013 | Wichmann et al. |
| 2013/0283808 A1 | 10/2013 | Kolvick |
| 2014/0000271 A1 | 1/2014 | Mittricker et al. |
| 2014/0000273 A1 | 1/2014 | Mittricker et al. |
| 2014/0007590 A1 | 1/2014 | Huntington et al. |
| 2014/0013766 A1 | 1/2014 | Mittricker et al. |
| 2014/0020398 A1 | 1/2014 | Mittricker et al. |

FOREIGN PATENT DOCUMENTS

| | | |
|---|---|---|
| EP | 0770771 | 5/1997 |
| GB | 776269 | 6/1957 |
| GB | 2117053 | 10/1983 |
| WO | WO9906674 | 2/1999 |
| WO | WO9963210 | 12/1999 |
| WO | WO2007068682 | 6/2007 |
| WO | WO 2008/074980 | 6/2008 |
| WO | WO2008142009 | 11/2008 |
| WO | WO2011003606 | 1/2011 |
| WO | WO2012003489 | 1/2012 |
| WO | WO2012128928 | 9/2012 |
| WO | WO2012128929 | 9/2012 |
| WO | WO2013147632 | 10/2013 |
| WO | WO2013147633 | 10/2013 |
| WO | WO2013155214 | 10/2013 |
| WO | WO2013163045 | 10/2013 |

OTHER PUBLICATIONS

Ertesvag, Ivar S., et al.. Exergy Analysis of a Gas-Turbin Combined-Cycle Power Plant With Precombustion $CO_2$ Capture, Elsivier, 2004.

Ahmed, S. et al. (1998) "Catalytic Partial Oxidation Reforming of Hydrocarbon Fuels," *1998 Fuel Cell Seminar*, Nov. 16-19, 1998, 7 pgs.

Air Separation Technology Ion Transport Membrane—Air Products 2008.

Air Separation Technology Ion Transport Membrane—Air Products 2011.

Anderson, R. E. (2006) "Durability and Reliability Demonstration of a Near-Zero-Emission Gas-Fired Power Plant," *California Energy Comm., CEC 500-2006-074*, 80 pgs.

Baxter, E. et al. (2003) "Fabricate and Test an Advanced Non-Polluting Turbine Drive Gas Generator," *U.S. Dept. of Energy, Nat'l Energy Tech. Lab., DE-FC26-00NT 40804*, 51 pgs.

Bolland, O. et al. (1998) "Removal of CO2 From Gas Turbine Power Plants Evaluation of Pre- and Postcombustion Methods," SINTEF Group, 1998, www.energy.sintef.no/publ/xergi/98/3/art-8engelsk.htm, 11 pgs.

Bryngelsson, M. et al. (2005) "Feasibility Study of CO2 Removal From Pressurized Flue Gas in a Fully Fired Combined Cycle—The Sargas Project," KTH—Royal Institute Of Technology, Dept. of Chemical Engineering And Technology, 9 pgs.

Clark, Hal (2002) "Development of a Unique Gas Generator for a Non-Polluting Power Plant," California Energy Commission Feasibility Analysis, P500-02-011F, Mar. 2002, 42 pgs.

Comparison of Ion Transport Membranes—Fourth Annual Conference on Carbon Capture and Sequestration DOE/NETL; May 2005.

Ciulia, Vincent. About.com. Auto Repair. How the Engine Works. 2001-2003.

Cryogenics. Science Clarified. 2012. http://www.scienceclarified.com/Co-Di/Cryogenics.html.

Defrate, L. A. et al. (1959) "Optimum Design of Ejector Using Digital Computers" Chem. Eng. Prog. Symp. Ser., 55 ( 21) pp. 46.

Ditaranto, M. et al. (2006) "Combustion Instabilities in Sudden Expansion Oxy-Fuel Flames," ScienceDirect, Combustion and Flame, v.146, Jun. 30, 2006, pp. 493-451.

Elwell, L. C. et al. (2005) "Technical Overview of Carbon Dioxide Capture Technologies for Coal-Fired Power Plants," *MPR Associates, Inc.*, Jun. 22, 2005, 15 pgs.

Eriksson, Sara. Licentiate Thesis 2005, p. 22. KTH—"Development of Methane Oxidation Catalysts for Different Gas Turbine Combustor Concepts." The Royal Institute of Technology, Department of Chemical Engineering and Technology, Chemical Technology, Stockholm Sweden.

Evulet, Andrei T. et al. "Application of Exhaust Gas Recirculation in a DLN F-Class Combustion System for Postcombustion Carbon Capture" ASME J. Engineering for Gas Turbines and Power, vol. 131, May 2009.

Evulet, Andrei T. et al. "On the Performance and Operability of GE's Dry Low Nox Combustors utilizing Exhaust Gas Recirculation for Post-Combustion Carbon Capture" Energy Procedia I 2009, 3809-3816.

http://www.turbineinletcooling.org/resources/papers/CTIC_WetCompression_Shepherd_ASMETurboExpo2011.pdf Jun. 2011.

Luby, P. et al. (2003) "Zero Carbon Power Generation: IGCC as the Premium Option," *Powergen International*, 19 pgs.

MacAdam, S. et al. (2008) "Coal-Based Oxy-Fuel System Evaluation and Combustor Development," *Clean Energy Systems, Inc.* 6 pgs.

Morehead, H. (2007) "Siemens Global Gasification and IGCC Update," *Siemens, Coal-Gen*, Aug. 3, 2007, 17 pgs.

Reeves, S. R. (2001) "Geological Sequestration of $CO_2$ in Deep, Unmineable Coalbeds: An Integrated Research and Commercial-Scale Field Demonstration Project," *SPE 71749*, 10 pgs.

Reeves, S. R. (2003) "Enhanced Coalbed Methane Recovery," *SPE 101466-DL*, 8 pgs.

Richards, G. A. et al. (2001) "Advanced Steam Generators," *National Energy Technology Laboratory*, 7 pgs.

Snarheim, D. et al. (2006) "Control Design for a Gas Turbine Cycle With $CO_2$ Capture Capabilities," *Modeling, Identification And Control*, vol. 00, 10 pgs.

Ulfsnes, R. E. et al. (2003) "Investigation of Physical Properties for $CO_2/H_2$ Mixtures for use in Semi-Closed $O_2/CO_2$ Gas Turbine Cycle With $CO_2$-Capture," *Department of Energy and Process Eng., Norwegian Univ. of Science and Technology*, 9 pgs.

(56) References Cited

OTHER PUBLICATIONS vanHemert, P. et al. (2006) "Adsorption of Carbon Dioxide and a Hydrogen-Carbon Dioxide Mixture," *Intn'l Coalbed Methane Symposium* (*Tuscaloosa, AL*) *Paper 0615*, 9 pgs.

Zhu, J. et al. (2002) "Recovery of Coalbed Methane by Gas Injection," *SPE 75255*, 15 pgs.

U.S. Appl. No. 13/596,684, filed Aug. 28, 2012, Slobodyanskiy et al.
U.S. Appl. No. 14/066,579, filed Oct. 29, 2013, Huntington et al.
U.S. Appl. No. 14/066,551, filed Oct. 29, 2013, Minto.
U.S. Appl. No. 14/144,511, filed Dec. 30, 2013, Thatcher et al.
U.S. Appl. No. 14/067,559, filed Oct. 30, 2013, Lucas John Stoia et al.
PCT/RU2013/000162, filed Feb. 28, 2013, General Electric Company.
U.S. Appl. No. 14/067,679, filed Oct. 30, 2013, Elizabeth Angelyn Fadde et al.
U.S. Appl. No. 14/067,714, filed Oct. 30, 2013, Carolyn Ashley Antoniono et al.
U.S. Appl. No. 14/067,726, filed Oct. 30, 2013, Carolyn Ashley Antoniono et al.
U.S. Appl. No. 14/067,731, filed Oct. 30, 2013, Carolyn Ashley Antoniono et al.
U.S. Appl. No. 14/067,739, filed Oct. 30, 2013, Carolyn Ashley Antoniono et al.
U.S. Appl. No. 14/067,797, filed Oct. 31, 2013, Anthony Wayne Krull et al.
U.S. Appl. No. 14/066,488, filed Oct. 29, 2013, Pramod K. Biyani et al.
U.S. Appl. No. 14/135,055, filed Dec. 19, 2013, Pramod K. Biyani et al.
U.S. Appl. No. 14/067,844, filed Oct. 30, 2013, John Farrior Woodall et al.
PCT/US13/036020, filed Apr. 10, 2013, General Electric Company/ExxonMobil Upstream Company.
U.S. Appl. No. 14/067,486, filed Oct. 30, 2013, Huntington et al.
U.S. Appl. No. 14/067,537, filed Oct. 30, 2013, Huntington et al.
U.S. Appl. No. 14/067,552, filed Oct. 30, 2013, Huntington et al.
U.S. Appl. No. 14/067,563, filed Oct. 30, 2013, Huntington et al.

\* cited by examiner

LOW EMISSION POWER GENERATION AND HYDROCARBON RECOVERY SYSTEMS AND METHODS

CROSS-REFERENCE TO RELATED APPLICATION

This application is the National Stage of International Application No. PCT/US2009/038645, filed 27 Mar. 2009, which claims the benefit of U.S. Provisional Patent Application 61/072,292 filed 28 Mar. 2008 entitled LOW EMISSION POWER GENERATION AND HYDROCARBON RECOVERY SYSTEMS AND METHODS and U.S. Provisional Patent Application 61/153,508 filed 18 Feb. 2009 entitled LOW EMISSION POWER GENERATION AND HYDROCARBON RECOVERY SYSTEMS AND METHODS and U.S. Provisional Patent Application 61/154,675 filed 23 Feb. 2009 entitled LOW EMISSION POWER GENERATION AND HYDROCARBON RECOVERY SYSTEMS AND METHODS, the entirety of which is incorporated by reference herein.

FIELD OF THE INVENTION

Embodiments of the invention relate to low emission power generation in hydrocarbon recovery processes. More particularly, embodiments of the invention relate to methods and apparatuses for utilizing nitrogen, oxygen, carbon dioxide, and hydrocarbon fuel with reformer technology to generate power in very low emission hydrocarbon recovery processes.

BACKGROUND OF THE INVENTION

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

Many enhanced hydrocarbon recovery operations can be classified as one of the following types: pressure maintenance and miscible flooding. In a pressure maintenance operation, inert gasses such as nitrogen are injected into a primarily gaseous reservoir to maintain at least a minimal pressure in the reservoir to prevent retrograde condensation and improve total recovery. In a miscible flooding operation, miscible gasses such as carbon dioxide are injected into a primarily liquidous reservoir to mix with the liquids, lowering their viscosity and increasing pressure to improve the recovery rate.

Many oil producing countries are experiencing strong domestic growth in power demand and have an interest in enhanced oil recovery (EOR) to improve oil recovery from their reservoirs. Two common EOR techniques include nitrogen ($N_2$) injection for reservoir pressure maintenance and carbon dioxide ($CO_2$) injection for miscible flooding for EOR. There is also a global concern regarding green house gas (GHG) emissions. This concern combined with the implementation of cap-and-trade or carbon tax policies in many countries make reducing $CO_2$ emissions a priority for these and other countries as well as the companies that operate hydrocarbon production systems therein. Efficiently producing hydrocarbons while reducing GHG emissions is one of the world's toughest energy challenges.

Some approaches to lower $CO_2$ emissions include fuel de-carbonization or post-combustion capture. However, both of these solutions are expensive and reduce power generation efficiency, resulting in lower power production, increased fuel demand and increased cost of electricity to meet domestic power demand. Another approach is an oxyfuel gas turbine in a combined cycle (e.g. where exhaust heat from the gas turbine Brayton cycle is captured to make steam and produce additional power in a Rankin cycle). However, there are no commercially available gas turbines that can operate in such a cycle and the power required to produce high purity oxygen significantly reduces the overall efficiency of the process.

One proposed approach utilizes an autothermal reformer unit (ATR) to produce hydrogen fuel and carbon dioxide for capture and/or injection. Such systems are disclosed in many publications, including, for example International Patent Application Number WO2008/074980 (the '980 application) and Ertesvåg, Ivar S., et al., "Exergy Analysis of a Gas-Turbine Combined-Cycle Power Plant With Precombustion $CO_2$ Capture," Elsivier (2004) (the Ertesvag reference), the relevant portions of which are hereby incorporated by reference. The '980 application and Ertesvag references disclose systems for reforming natural gas in an auto-thermal reformer (ATR) to form a syngas, then separating the $CO_2$ from the syngas and sending the hydrogen-rich fuel to a conventional combined-cycle (CC) process.

As such, there is still a substantial need for a low emission, high efficiency hydrocarbon recovery process.

SUMMARY OF THE INVENTION

One embodiment of the present disclosure includes integrated systems. The integrated systems include a pressure swing reformer unit configured to utilize an air stream, a natural gas stream, and a steam stream to produce a regeneration stream comprising substantially nitrogen and a syngas stream comprising carbon monoxide, carbon dioxide, and hydrogen; and a pressure maintenance reservoir to receive at least a portion of the regeneration stream comprising substantially nitrogen. The integrated system may also include a water-gas shift reactor configured to convert at least a portion of the carbon monoxide to carbon dioxide; a separation unit configured to separate the syngas stream into a carbon dioxide stream and a hydrogen stream; and an enhanced oil recovery reservoir to receive at least a portion of the carbon dioxide stream. Additionally, some embodiments of the system may include a gas turbine configured to utilize the hydrogen stream to generate power and a gaseous exhaust stream.

Another embodiment of the present disclosure includes methods of producing hydrocarbons. The methods include producing a regeneration stream comprising substantially nitrogen and a syngas stream comprising carbon monoxide, carbon dioxide, and hydrogen in a pressure swing reformer; injecting at least a portion of the regeneration stream comprising substantially nitrogen into a pressure maintenance reservoir; and producing hydrocarbons from the pressure maintenance reservoir. Other embodiments of the methods may include converting at least a portion of the carbon monoxide to carbon dioxide in a gas-water shift reactor; separating the syngas stream into a carbon dioxide stream and a hydrogen stream; generating power in a gas turbine, wherein the gas turbine is configured to utilize at least a portion of the hydrogen stream as fuel; injecting at least a portion of the carbon dioxide stream into an enhanced oil recovery reservoir; and producing hydrocarbons from the enhanced oil recovery reservoir. Further embodiments may include recycling at least a portion of the hydrocarbons produced from the enhanced oil recovery reservoir to the pressure swing reformer; and recycling at least a portion of the hydrocarbons produced from the pressure maintenance reservoir to the pressure swing reformer.

In a third embodiment of the present disclosure, alternative integrated systems are provided. The integrated systems include a reactor unit configured to utilize an air stream, a hydrocarbon fuel stream, and a steam stream to produce a syngas stream comprising carbon monoxide, carbon dioxide, nitrogen, and hydrogen; a water-gas shift reactor configured to convert at least a portion of the carbon monoxide to carbon dioxide to form a shifted stream; a first separation unit configured to separate the carbon dioxide stream from the shifted stream to produce a substantially carbon dioxide stream and a mixed products stream comprising substantially nitrogen and hydrogen; a gas turbine configured to utilize the mixed products stream to generate power and a gaseous exhaust stream comprising nitrogen and steam; a second separation unit configured to separate the nitrogen from the steam to produce at least a gaseous nitrogen stream; and a pressure maintenance reservoir to receive at least a portion of the gaseous nitrogen stream.

In a fourth embodiment of the disclosure, alternative methods for producing hydrocarbons are disclosed. The methods include producing a syngas stream comprising carbon monoxide, carbon dioxide, nitrogen, and hydrogen utilizing a reactor unit; converting at least a portion of the carbon monoxide to carbon dioxide in a gas-water shift reactor to form a shifted stream; separating the carbon dioxide from the shifted stream to produce a substantially carbon dioxide stream and a mixed products stream comprising substantially nitrogen and hydrogen; generating power and a gaseous exhaust stream comprising nitrogen and steam in a gas turbine, wherein the gas turbine is configured to utilize the mixed products stream comprising substantially nitrogen and hydrogen as fuel; separating the nitrogen from the steam to produce at least a gaseous nitrogen stream; injecting at least a portion of the gaseous nitrogen stream into a pressure maintenance reservoir; and producing hydrocarbons from the pressure maintenance reservoir.

In a fifth embodiment of the present disclosure, yet another alternative embodiment of integrated systems is provided. The systems include an air separation unit configured to generate a substantially nitrogen stream and a substantially oxygen stream; a reactor unit configured to utilize the substantially oxygen stream, a hydrocarbon fuel stream, and a steam stream to produce a syngas stream comprising carbon monoxide, carbon dioxide, and hydrogen; a water-gas shift reactor configured to convert at least a portion of the carbon monoxide to carbon dioxide; a separation unit configured to separate the syngas stream into a carbon dioxide stream and a hydrogen stream; and an enhanced oil recovery reservoir to receive at least a portion of the separated carbon dioxide stream.

In a sixth embodiment of the present disclosure, additional alternative methods of producing oil are provided. The methods include separating air in an air separation unit configured to generate a substantially nitrogen stream and a substantially oxygen stream; producing a syngas stream comprising carbon monoxide, carbon dioxide, and hydrogen using a reactor unit configured to utilize the substantially oxygen stream, a hydrocarbon fuel stream, and a steam stream; converting at least a portion of the carbon monoxide to carbon dioxide in a gas-water shift reactor to form a shifted stream; separating the shifted stream into a carbon dioxide stream and a hydrogen stream; injecting at least a portion of the separated carbon dioxide stream into an enhanced oil recovery reservoir; and producing hydrocarbons from the enhanced oil recovery reservoir.

BRIEF DESCRIPTION OF THE DRAWINGS

The foregoing and other advantages of the present invention may become apparent upon reviewing the following detailed description and drawings of non-limiting examples of embodiments in which.

DETAILED DESCRIPTION OF THE INVENTION

Figure 1:
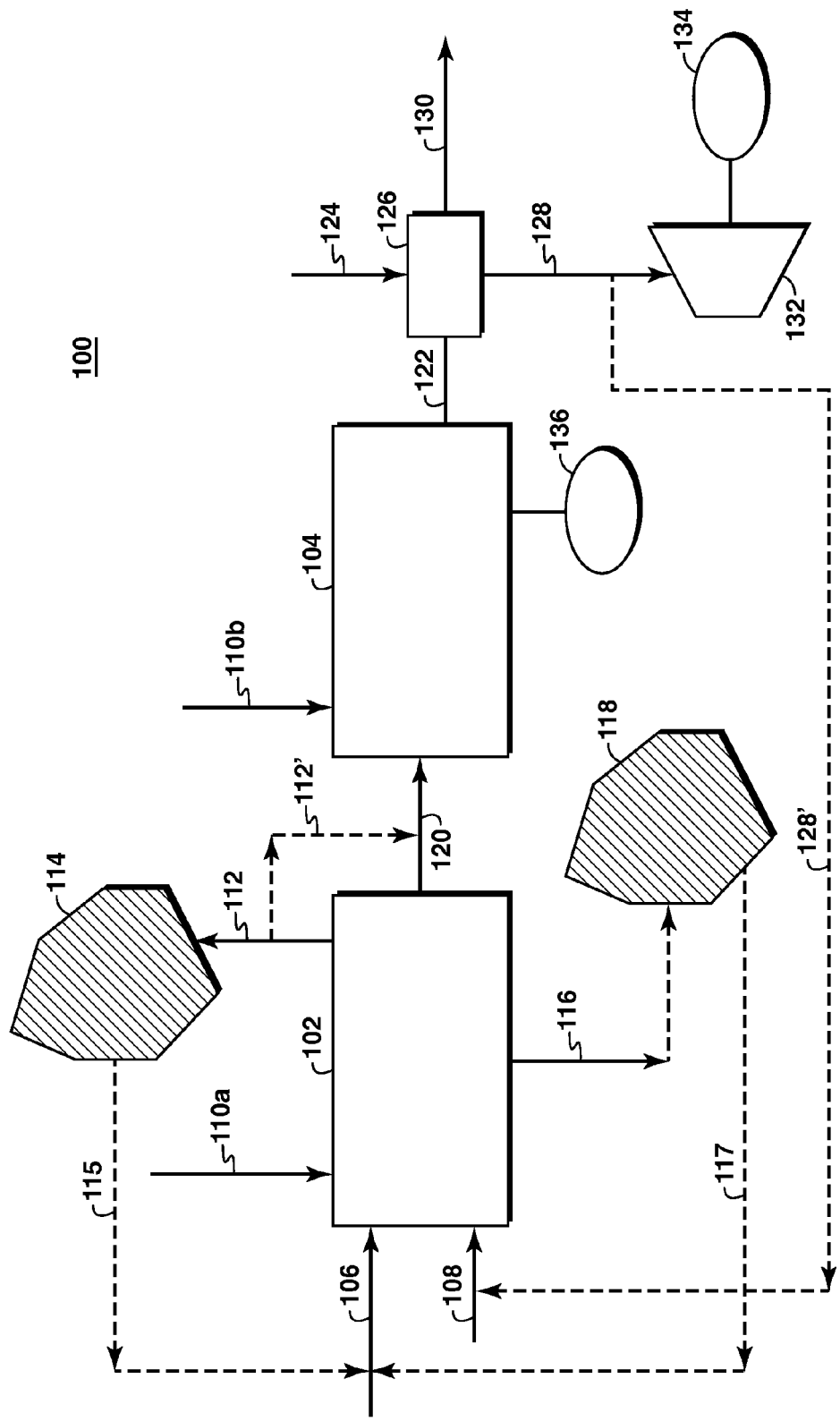
FIG. 1 illustrates an integrated system for low emission power generation and hydrocarbon recovery using a pressure swing reforming unit.

In the following detailed description section, the specific embodiments of the present invention are described in connection with preferred embodiments. However, to the extent that the following description is specific to a particular embodiment or a particular use of the present invention, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

At least one benefit of the system is integration of two types of recovery processes to produce two types of injection gas (nitrogen and $CO_2$) for additional hydrocarbon recovery. One exemplary approach to produce $N_2$, $CO_2$ and power to take advantage of the catalytic combustion step within a Pressure Swing Reforming (PSR) process to reactively remove oxygen from an air stream, while simultaneously producing high pressure syngas that is readily separated into a $CO_2$ stream for petroleum production operations and a hydrogen ($H_2$) stream to be used in high-efficiency power generation. In this unexpected application of PSR systems and processes, the regeneration step may be advantageously operated at a high pressure that is similar to the reforming pressure. In one embodiment of the present invention, the reforming and regenerations steps are both operated at similar and high (e.g.

300-500 psig) pressures. In another embodiment, a small amount of the nitrogen produced in the regeneration step is used to dilute the hydrogen prior to the hydrogen's use as fuel in a gas turbine system. Pressure Swing Reforming processes have been disclosed in at least U.S. Pat. No. 7,491,250 and U.S. App. No. 2005/0201929, the latter of which is hereby incorporated by reference.

Additional embodiments of the presently disclosed systems and processes include production of $N_2$, $CO_2$, and power for petroleum production operations using an air-based Autothermal Reformer (ATR), partial oxidation reactor (POX) or other reactor unit. In the ATR, exothermic partial oxidation of methane and endothermic catalytic steam reforming produce high pressure syngas that is readily converted through the water-gas shift reaction into $CO_2$ and hydrogen ($H_2$), and separated into a $CO_2$ stream for petroleum production operations and a hydrogen ($H_2$) stream to be used in high-efficiency power generation. The POX performs the same partial oxidation reaction as the ATR, but at a higher temperature and without a catalyst.

Further additional embodiments of the presently disclosed systems and processes include production of nitrogen ($N_2$), $CO_2$ and power through using a conventional Air Separation Unit (ASU) to produce an enriched or pure $N_2$ stream for $N_2$ substitution while simultaneously producing an enriched or pure oxygen stream as feed to an Autothermal Reformer (ATR) in which exothermic partial oxidation of methane and endothermic catalytic steam reforming produce high pressure syngas that may be readily converted through the water-gas shift reaction into $CO_2$ and hydrogen ($H_2$), and separated into a $CO_2$ stream for petroleum production operations and a hydrogen ($H_2$) stream to be used in high-efficiency power generation.

Although it is possible to produce nitrogen for reservoir pressure maintenance and carbon dioxide for EOR completely independently, embodiments of the disclosed systems and methods take advantage of the synergies that are possible when both nitrogen and carbon dioxide are produced in an integrated process to accomplish the production of these gases at a much lower cost while also producing power and/or desalinated water with ultra low emissions. Note, that if EOR utilization is not possible, the $CO_2$ produced by the power production can be purged from the recycle stream and sequestered or stored. This allows the various embodiments to be utilized for power production with ultra-low emissions.

In one embodiment, power may be produced from the hydrogen stream via combustion at elevated pressure, so that additional power can be produced by expanding the products of combustion across the expander of a gas turbine. The efficiency of a Brayton cycle is a function of the pressure ratio across the expander and the inlet temperature to the expander. Therefore, moving to higher-pressure ratios and higher expander inlet temperatures increases gas turbine efficiency. The inlet temperature to the expander may be limited by material considerations and cooling of the part surfaces. Using these types of fuels in a high pressure combustor and then expanding them in the expander section can result in high efficiencies and provide an economical way for utilizing such reserves. Depending on the well head pressure available, the expansion may also be stopped at an elevated pressure to reduce the cost associated with compressing nitrogen for well pressurization operations.

Referring now to the figures, FIG. 1 illustrates an integrated system for low emission power generation and hydrocarbon recovery using a pressure swing reforming unit. The system 100 comprises a pressure swing reformer unit 102 configured to utilize an air stream 110a, a natural gas stream 106 and a steam stream 108 to produce a regeneration stream 112 comprising substantially nitrogen ($N_2$) a carbon dioxide ($CO_2$) stream 116 and a hydrogen stream 120. The system 100 may further include an enhanced oil recovery reservoir 118 to receive the carbon dioxide stream 116 and optionally produce a hydrocarbon stream 117 and a pressure maintenance reservoir 114 to receive the regeneration stream 112 and optionally produce a hydrocarbon stream 115. In some embodiments, a gas turbine unit 104 is also provided, which utilizes an air stream 110b and the hydrogen stream 120 to generate power 136 and a gaseous exhaust stream 122, which may be directed to a heat recovery unit 126 configured to utilize water 124 to cool the gaseous exhaust stream 122 to form a cooled exhaust stream 130, produce at least one unit of steam 128 for use in steam generator 132 to produce power 134.

In some alternative embodiments, at least a portion of the regeneration stream 112 may be redirected to combine with the hydrogen stream 120 via stream 112'. In another alternative embodiment, at least a portion of the steam 128 may be redirected to combine with the steam stream 108 via stream 128'. In yet another alternative embodiment, air stream 110b may be compressed by the compressor integrated into the gas turbine 104.

Figure 2:
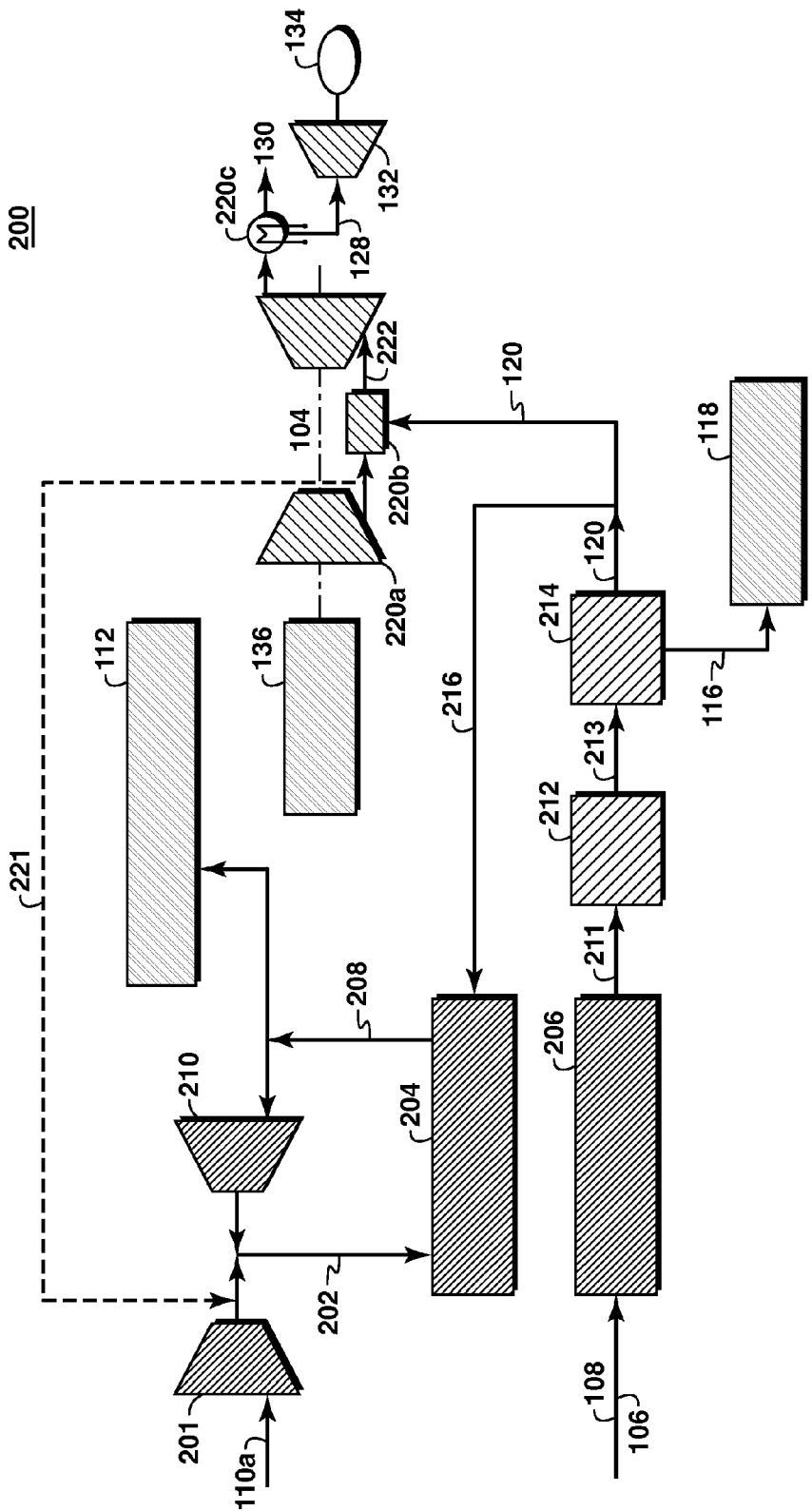
FIG. 2 illustrates a schematic of an integrated system for low emission power generation and hydrocarbon recovery using a pressure swing reforming unit like that shown in FIG. 1.

FIG. 2 illustrates a schematic of an integrated system for low emission power generation and hydrocarbon recovery using a pressure swing reforming unit like that shown in FIG. 1. As such, FIG. 2 may be best understood with reference to FIG. 1. The system 200 is an alternative, exemplary embodiment of the system 100 and includes an inlet air compressor 201, a compressed inlet stream 202, which may contain some recycled nitrogen from stream 208 via compressor 210, wherein the inlet stream 202 is introduced into the PSR regeneration unit 204. The PSR 102 also includes a PSR reform unit 206 for receiving the steam 108 and natural gas 106, which produces a syngas stream 211 comprising carbon monoxide, carbon dioxide, and hydrogen, which is fed to a water-gas shift reactor 212 to convert at least a portion of the carbon monoxide to carbon dioxide, then sent to a separator 214, which separates as much of the carbon dioxide as possible into stream 116 to produce the hydrogen stream 120. The gas turbine 104 includes an integrated compressor 220a, combustor 220b, and expander 220c. Optionally, at least a portion of the hydrogen stream 120 may be redirected to the PSR regeneration unit 204 via stream 216, in which case hydrogen stream 120' is fed to the combustor 220b. Optionally, compressed air may be routed from the inlet compressor 220a to the inlet stream 202 via stream 221.

Figure 3:
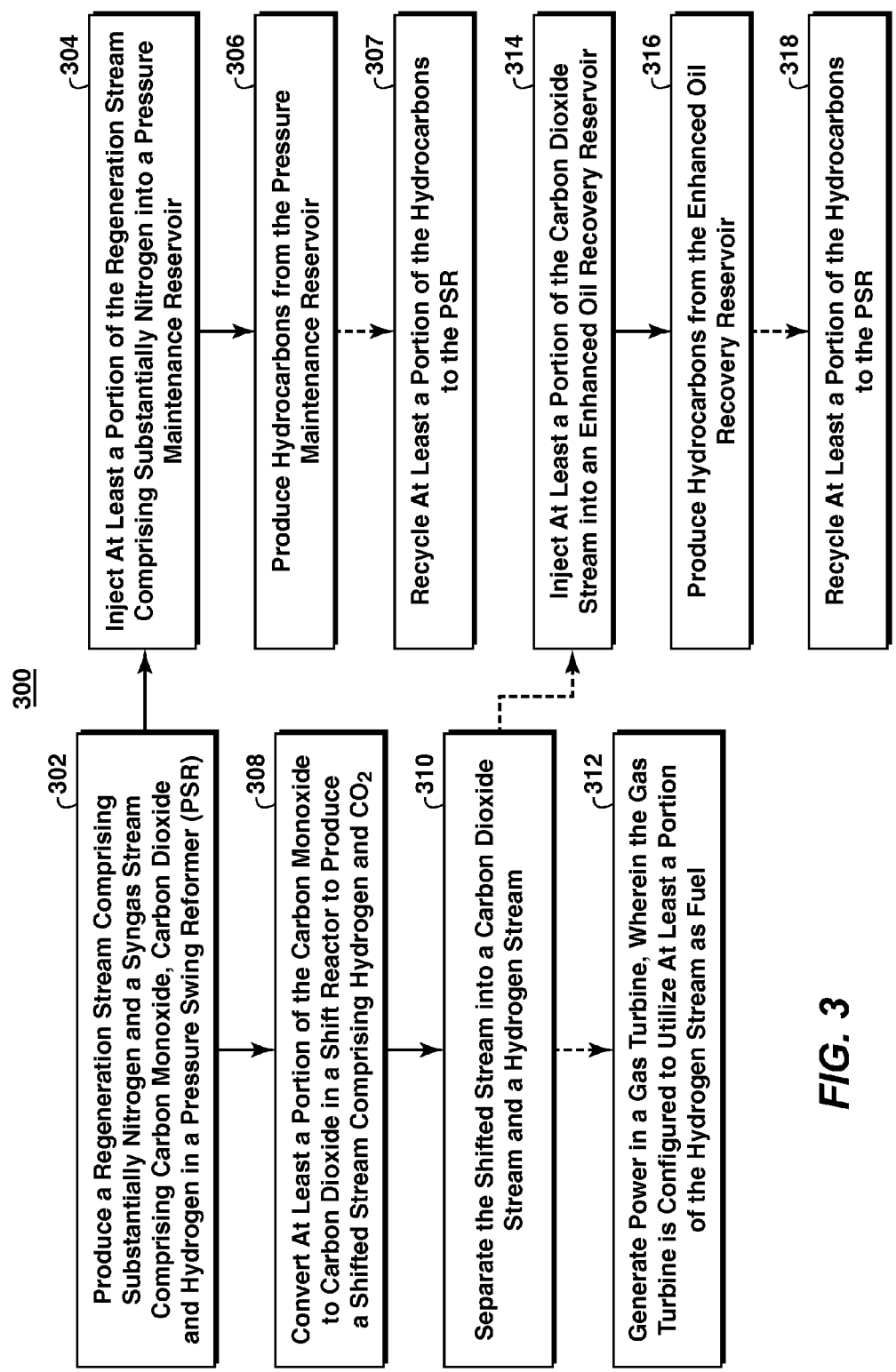
FIG. 3 is an exemplary flow chart of a method of operating an integrated system for low emission power generation and hydrocarbon recovery using a pressure swing reforming unit like those shown in FIGS. 1-2.

FIG. 3 is an exemplary flow chart of a method of operating an integrated system for low emission power generation and hydrocarbon recovery using a pressure swing reforming unit like those shown in FIGS. 1-2. As such, FIG. 3 may be best understood with reference to FIGS. 1-2. The method 300 includes the steps of producing 302 a regeneration stream 208 comprising substantially nitrogen and a syngas stream 211 comprising carbon monoxide, carbon dioxide, and hydrogen in a pressure swing reformer 102; injecting 304 at least a portion of the regeneration stream comprising substantially nitrogen 112 into a pressure maintenance reservoir 114 (note, stream 112 is an optional portion of stream 208, which may be divided into stream 112 sent to hydrocarbon production operations and a recycle stream that is combined with fresh air 110a to generate the PSR regeneration oxidant stream 202); and producing hydrocarbons 306 from the pressure maintenance reservoir 114. The process 300 may optionally further include recycling at least a portion of the produced hydrocarbons via stream 115 to a hydrocarbon feed stream 106 for use in the PSR 102.

In one alternative embodiment, the method 300 may further include converting 308 at least a portion of the carbon monoxide to carbon dioxide in a gas-water shift reactor 212 to produce a shifted stream 213 comprising hydrogen and carbon dioxide; separating 310 the shifted stream 213 into a carbon dioxide stream 116 and a hydrogen stream 120; injecting 314 at least a portion of the carbon dioxide stream 116 into an enhanced oil recovery reservoir 118; producing hydrocarbons 316 from the enhanced oil recovery reservoir 118; and optionally recycling 318 at least a portion of the produced hydrocarbons via stream 117 to a hydrocarbon feed stream 106 for use in the PSR 102. Additionally, the process 300 may further include generating 312 power 136 in a gas turbine 104, wherein the gas turbine 104 is configured to utilize at least a portion of the hydrogen stream 120 as fuel.

In one exemplary embodiment of the systems 100 and 200 and method 300, the PSR reforming step 302 may be carried out at a pressure sufficient to supply fuel (e.g. hydrogen streams 120 or 120') to the gas turbine 104 (e.g. about 50 to about 200 pounds per square inch gauge (psig) above gas turbine combustion pressure). The feed 106, 108 to the reforming step may be comprised of natural gas and steam. The product from the reforming step 302 is a syngas mixture comprising CO, $H_2$, $CO_2$, $H_2O$, and other components (e.g. contaminants). After optional $H_2O$ addition, the stream is shifted 304 to convert most of the CO to $CO_2$ (yielding more hydrogen), and a separation is performed 306 to remove the $CO_2$. Separation can be via conventional acid gas scrubbing, membrane separation, physical or chemical absorption solvents, or any other effective process. The removed $CO_2$ 116 is conditioned as required (not shown) for petroleum production operations and transported to that use.

Hydrogen 120 that remains after the $CO_2$ removal step 306 is used for power generation. The hydrogen 120 may be used in any power generating cycle, but is advantageously used as feed to a gas turbine power system, more advantageously to a combined cycle gas turbine power system. Some fraction of the steam 128' that is produced in a combined cycle gas turbine power system may be used as the reforming feed steam 108. In one embodiment of the present disclosure, steam may be raised by cooling the regeneration flue gas 208 prior to recycle, and this steam is used as the reforming feed steam 108. In another alternative embodiment of the present disclosure, some fraction of the produced hydrogen 216 is used as fuel in the PSR regeneration step 302.

In one unexpected arrangement of the PSR process 300, the regeneration unit 204 is advantageously operated at a pressure similar to the operating pressure of the reforming unit 206. In one embodiment of the present invention, the reforming and regenerations steps are both operated at similar and high (e.g. 300-500 psig) pressures. In yet another alternative embodiment, a small amount of the nitrogen produced in the regeneration step 208 is used to dilute the hydrogen 120 prior to the hydrogen's use as fuel in a gas turbine system 104.

One advantage of the present system is that the PSR reforming step 302 is relatively insensitive to impurities such as higher hydrocarbons, nitrogen, sulfur and $CO_2$. Thus, the natural gas feed 106 to the reformer 102 can be a lower-purity stream that is generated as part of the petroleum production operations (e.g. from production/recycle streams 115 or 117). This can save substantial gas cleanup costs for the petroleum production operations.

Higher hydrocarbons normally will cause soot or coke formation in conventional reformers, but are more readily reformed by the PSR system 102. Advantageously, nitrogen in the PSR reforming feed may pass through the reformer and end up an acceptable (even preferred) fuel diluent 112' in the hydrogen 120 that is sent to power gas turbine 104. Carbon dioxide in the PSR reforming feed can reduce the amount of steam 108 needed for reforming, but will shift product distribution toward CO. Some additional steam may be added to the shift reactor 212 to drive all of the CO to $CO_2$, but then the existing separation will capture this $CO_2$ for re-use in petroleum production operations. Further, the PSR 102 is substantially more tolerant of sulfur than conventional reforming processes. Sulfur at levels of 10 to 100 ppm in hydrocarbon feed can be accommodated. However, this sulfur will emerge in the PSR products, some as SOx in the substantially nitrogen stream 208, and some as $H_2S$ in the $CO_2$ stream 116. Thus, sulfur should be allowed to enter the PSR reformer 206 only if its emergence in streams 208 and 116 does not interfere with the petroleum production operations.

Although two reservoirs 114 and 118 are referenced, the reservoirs may be the same reservoir, be two, three, four or more different reservoirs, and may include multiple reservoirs for injection or production. Further, the content of the production streams from the reservoirs 115 and 117 will likely change over time, particularly at "break-through" where the injected gases begin to be produced.

In general, the EOR reservoir 118 is a reservoir or a portion of a reservoir that comprises substantially liquid hydrocarbons such as crude oil and is generally located over an aquifer. The liquid hydrocarbons are miscible with injected compressed carbon dioxide stream 116 at the proper temperature and pressure. High $CO_2$ concentrations (e.g. up to about 90 volume % or greater) are preferred in such a miscible flooding operation because the $CO_2$ acts as a dilute to lower the viscosity of the oil and as a solvent to remove the oil from the formation rock, and other reasons. In addition, less power is needed to pump the gas 116 into the reservoir if it properly mixes. Oxygen levels in the injection stream 116 are preferably kept very low.

In general, the pressure maintenance reservoir 114 is a reservoir or a portion of a reservoir that includes a gas cap above an oil producing formation. As the liquids are produced, the gas cap pressure and formation pressure is reduced, resulting in lower production and possibly retrograde condensation in the gas portion. The injected gas 1112 is configured to maintain the pressure in the reservoir to at least maintain recovery pressure and avoid retrograde condensation. Miscibility is not an issue in such an operation. As such, inert gasses like nitrogen are preferred. In the special, exemplary case where at least the injection reservoirs 114 and 118 are the same, the nitrogen may be injected into the gas cap of the reservoir and the carbon dioxide is used as a miscible injectant for EOR in the same reservoir.

The production streams 115 and 117 may be the same or different or include production from multiple reservoirs and may include any variety of light and heavy liquid and gaseous hydrocarbon components as well as other non-hydrocarbon components such as carbon dioxide, hydrogen sulfide, nitrogen, carbonyl sulfide, and combination thereof. During initial or early stage production, it is expected that there will be significantly more heavy hydrocarbon components than sour or non-hydrocarbon components in the production streams 115 and 117. After optional separation and clean-up, stream 117 may comprise from at least about 70 mol percent (%) hydrocarbons to about 99 mol % hydrocarbons, from about 1 mol % to about 5 mol % $CO_2$, from about 0 mol % $N_2$ to about 5 mol % $N_2$, and some other components.

As hydrocarbons are produced and particularly once gas breakthrough occurs, the compositions of streams 115 and 117 may change drastically. For example, after $CO_2$ breakthrough, an exemplary production stream 117 may have the following contents: about 5 mol percent (%) hydrocarbons to about 60 mol % hydrocarbons, from about 40 mol % to about 95 mol % $CO_2$, from about 0 mol % $N_2$ to about 10 mol % $N_2$, and some other components. After nitrogen breakthrough, an exemplary production stream 115 may have the following contents: about 5 mol percent (%) hydrocarbons to about 60 mol % hydrocarbons, from about 5 mol % to about 20 mol % $CO_2$, from about 40 mol % $N_2$ to about 95 mol % $N_2$, and some other components. Note that breakthrough is a transient process rather than a step-wise process resulting in a relatively fast, but gradual increase in the amount of breakthrough gas produced. For example, a reservoir may steadily produce about 5 mol % $CO_2$ during early production, then produce an increasing amount of $CO_2$ during a transition period (from a month to several years) until the $CO_2$ production reaches a high steady state production of about 95 mol % $CO_2$.

In additional embodiments, it may be desirable to keep hydrogen stream 120 at higher temperatures for mixing and combustion in the combustor 220b. Stream 120 may be heated by cross-exchange with hot exhaust gas stream 122 or steam streams 128 or 128', heat generated by one of the other compressors in the system 200 (e.g. compressors 201, 210, or 220a), or the HRSG 126. A temperature sufficient to improve the efficiency of combustion in the combustor 220b is preferred. In one embodiment, the hydrogen stream 120 may be from about 50 degrees Celsius (° C.) to about 500° C. upon entering the combustor 220b.

The combustor 220b may be a standard combustor or may be a customized or modified combustor. Examples of applicable combustor types include a partial oxidation (POX) burner, diffusion burners, lean-premix combustors, and piloted combustors. Note that each burner type may require some modification to work with the available fuel stream. In the diffusion flame combustor (or "burner") the fuel and the oxidant mix and combustion takes place simultaneously in the primary combustion zone. Diffusion combustors generate regions of near-stoichiometric fuel/air mixtures where the temperatures are very high. In pre-mix mix combustors, fuel and air are thoroughly mixed in an initial stage resulting in a uniform, lean, unburned fuel/air mixture that is delivered to a secondary stage where the combustion reaction takes place. Lean-premix combustors are now common in gas turbines due to lower flame temperatures, which produces lower NOx emissions. In the piloted combustor a hot flamed pilot ensures that the lean fuel oxidant mixture surrounding it maintains stable combustion. These piloted combustors are typically used in aircraft engines and for fuels that may not be able to maintain stable combustion on their own.

PSR EXAMPLE

To further illustrate embodiments of the PSR system 102, some exemplary streams of the calculated heat and material balance for the embodiments shown in FIGS. 1-2 are given in Table 1 below. This exemplary pressure swing reformer system 102 is operated as two cylindrical reactors alternating between regeneration and reforming step. As shown, unit 204 reflects the reactor vessel currently in the regeneration step while unit 206 reflects reactor vessel currently in the reforming step. The reactors have internal dimensions of 11 ft (3.4 M) diameter and 4 ft (1.2 M) length. The reactors are positioned with cylindrical axis in a vertical orientation, and reforming is carried out as up-flow; regeneration as downflow. The packing is composed of 400 cell/in$^2$ (62 cell/cm$^2$) honeycomb monolith having a bulk density of 50 lb/ft$^3$ (0.8 g/cc). The bottom 70% of the packing includes reforming catalyst. Overall cycle length is 30 seconds; 15 s for the regeneration step and 15 seconds for the reforming step. A brief steam purge is included at the end of the reforming step.

The reforming unit 206 is fed with methane 106 at the rate of 1760 kgmoles/hr, accompanied by steam 108 at a rate of 4494 kgmoles/hr, representing a reforming C1GHSV of 3,600 hr$^{-1}$. Syngas (reformate) 211 is produced at rates shown in Table 1, and converted in high and low temperature shift stages 212 to yield shifted product 213. Separation is accomplished by absorption using an activated MDEA solvent system, yielding 1647 kgmoles/hr of $CO_2$ in purified stream 116 and hydrogen rich fuel stream 120 shown in Table 1.

Of the hydrogen-rich fuel, 26% is used in the PSR regeneration step (via stream 216) and 74% is consumed and sent to the gas turbine 104 via stream 120' shown on Table 1. The gas turbine 104 operates with air compression to 12.6 atm. abs. and 384° C.; a heat rate of 10,100 BTU/kWh (10655 kJ/kWh); 921 lb/sec (418 kg/s) turbine flow; and 126 MW net power output 136.

Air compressor 201 provides fresh air 110a to the PSR regeneration system, as shown in Table 1. This air is combined with recycle flue gas compressed by compressor 210 and fed as stream 202 to the PSR regeneration step. Regeneration exhaust 208 (prior to recycle removal) is shown in Table 1. The non-recycled fraction of the PSR effluent 208 is cooled to remove water resulting in $N_2$ product 112 shown on Table 1.

TABLE 1

(PSR at 3600 hr$^{-1}$ C1GHSV)

| | Stream # | | | | | | |
|---|---|---|---|---|---|---|---|
| | 211 | 116 | 120 | 120' | 110a | 208 | 112 |
| Temperature, ° C. | 401 | 65 | 65 | 65 | 25 | 427 | 65 |
| Pressure, atm abs | 16 | 2 | 15 | 15 | 1 | 12.2 | 12.2 |

| | stream name | | | | | | |
|---|---|---|---|---|---|---|---|
| Kgmols/hr | Reformate | CO2 Product | H2 product | GT H2 Fuel | Fresh Air | PSR Flue | N2 Product |
| H2O | 2,189 | 30 | 123 | 91 | 0 | 7,681 | 60 |
| O2 | 0 | 0 | 0 | | 912 | 24 | 6 |
| N2 | 171 | 0 | 171 | 126 | 3,432 | 14,757 | 3,432 |
| CO2 | 263 | 1,647 | 0 | | 0 | 100 | 23 |

TABLE 1-continued (PSR at 3600 hr$^{-1}$ C1GHSV)

| | | | | | | | |
|---|---|---|---|---|---|---|---|
| CH4 | 35 | 0 | 35 | 26 | 0 | 0 | 0 |
| CO | 1,458 | 0 | 73 | 54 | 0 | 0 | 0 |
| H2 | 5,456 | 3 | 6,838 | 5,059 | 0 | 0 | 0 |
| Total | 9,572 | 1,680 | 7,241 | 5,356 | 4,344 | 22,555 | 3,521 |

Figure 4:
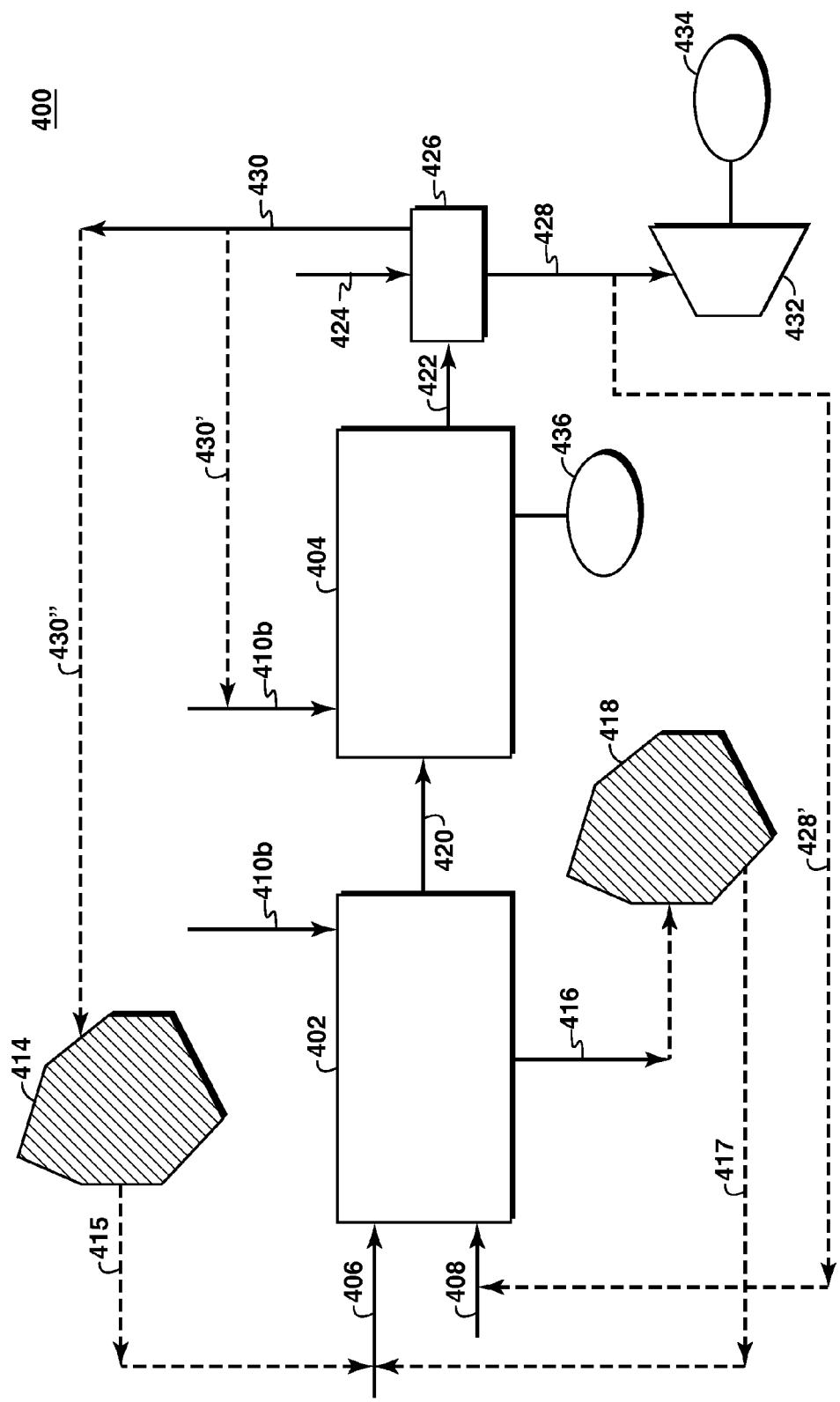
FIG. 4 is an illustration of an integrated system for low emission power generation and hydrocarbon recovery using a reactor unit.

FIG. 4 is an illustration of an integrated system for low emission power generation and hydrocarbon recovery using a reactor unit. The system 400 comprises a reactor unit 402 configured to utilize an air stream 410a, a hydrocarbon fuel stream 406 and a steam stream 408 to produce a carbon dioxide ($CO_2$) stream 416 and a mixed products stream 420 substantially comprising hydrogen and nitrogen. The system 400 may further include an enhanced oil recovery reservoir 418 to receive the carbon dioxide stream 416 and optionally produce a hydrocarbon stream 417 and a pressure maintenance reservoir 414, which optionally produces a hydrocarbon stream 415. In some embodiments, a gas turbine unit 404 is also provided, which utilizes an air stream 410b and the mixed products stream 420 to generate power 436 and a gaseous exhaust stream 422 comprising steam and nitrogen, which may be directed to a heat recovery unit 426 configured to utilize water 424 to cool the gaseous exhaust stream 422 to form a cooled exhaust stream 430 comprising substantially nitrogen, produce at least one unit of steam 428 for use in steam generator 432 to produce power 434.

In some alternative embodiments, at least a portion of the cooled exhaust stream 430 may be further separated to increase the nitrogen concentration and the nitrogen may be redirected to the air stream 410b for use as a diluent in the gas power turbine or sent to the pressure maintenance reservoir 414 via line 430". In addition, at least a portion of the steam 428 may be redirected to combine with the steam stream 408 via stream 428'. In yet another alternative embodiment, air stream 410b may be compressed by an air compressor integrated into the gas turbine 404.

Figure 5:
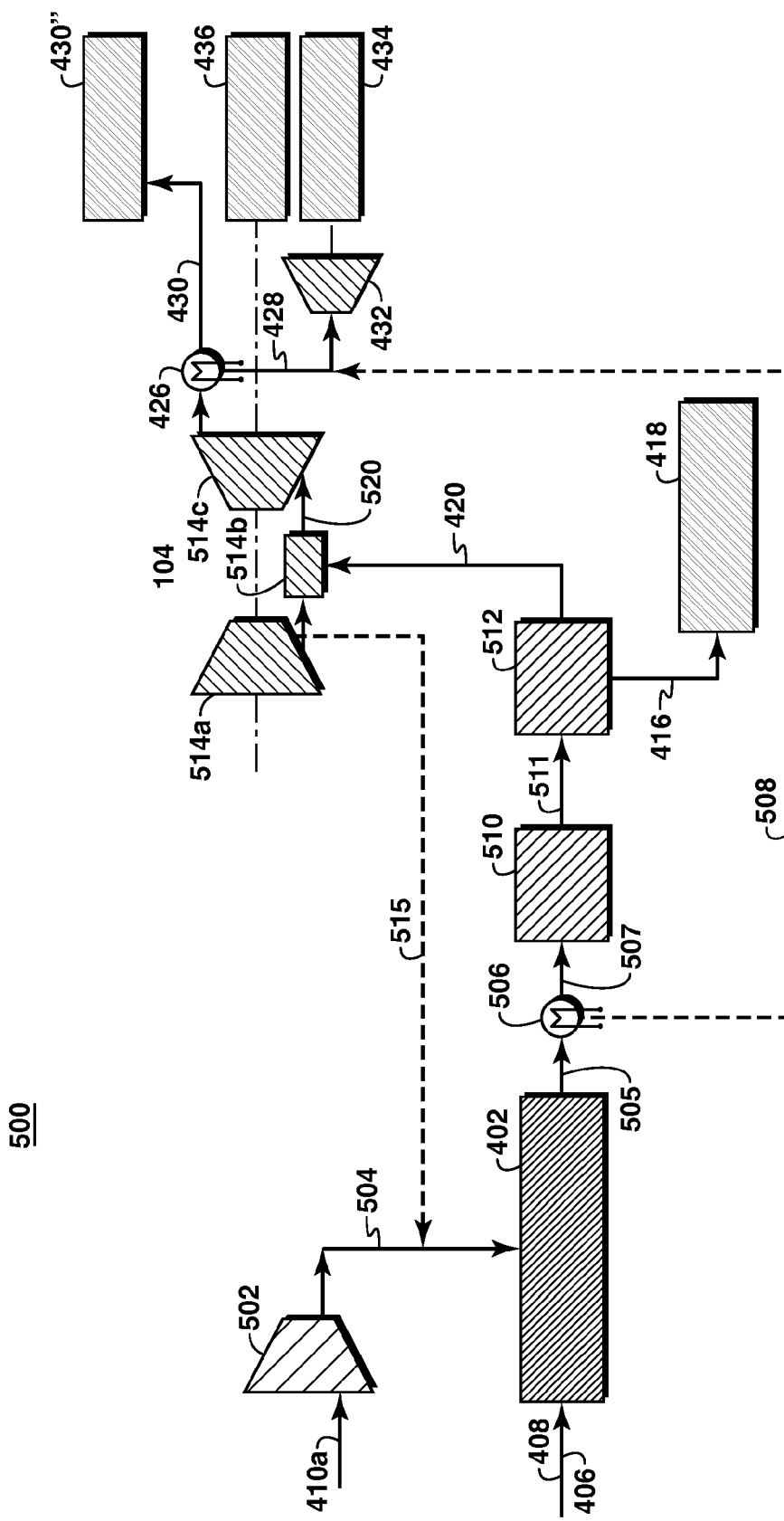
FIG. 5 illustrates a schematic of an integrated system for low emission power generation and hydrocarbon recovery using a reactor unit like that shown in FIG. 4.

FIG. 5 illustrates a schematic of an integrated system for low emission power generation and hydrocarbon recovery using a reactor unit like that shown in FIG. 4. As such, FIG. 5 may be best understood with reference to FIG. 4. System 500 is an alternative, exemplary embodiment of the system 400 and includes an inlet air compressor 502 and a compressed inlet stream 504, wherein the inlet stream 504 is introduced into the reactor unit 402. The reactor unit 402 produces a syngas stream 505 comprising carbon monoxide, carbon dioxide, nitrogen, and hydrogen, which may be fed to a water-gas shift reactor 510 to convert at least a portion of the carbon monoxide to carbon dioxide to form a shifted stream 511 comprising substantially carbon dioxide, nitrogen, and hydrogen, which may be sent to a separator 512, which separates as much of the carbon dioxide as possible into stream 416 to produce the mixed products stream having substantially hydrogen and nitrogen 420. Separator 512 may be a solvent-based absorption/regeneration system such as an amine or physical solvent system. The gas turbine 404 includes an integrated air compressor 514a, combustor 514b, and expander 514c. The mixed products stream 420 may then be mixed and combusted (pre-mixed or other arrangement, as discussed above) with the high pressure air from integrated compressor 514a to form combustion products stream 520, which may then be expanded via expander 514c. Optionally, compressed air may be routed from the inlet compressor 514a to the inlet stream 504 via stream 515.

In one exemplary alternative embodiment, the integrated compressor 514a is the same as the compressor 502 and a portion of the high pressure air 504 is used in the reactor unit, while the remainder is used in the combustor 514b. In addition, the system 500 may optionally include a heat exchanger 506 configured to form an optional steam stream 508 utilizing the heat from syngas stream 505 to form slightly cooled syngas stream 507. Optional steam stream 508 may be added to steam stream 428 or 428' or utilized with steam stream 408.

Figure 6:
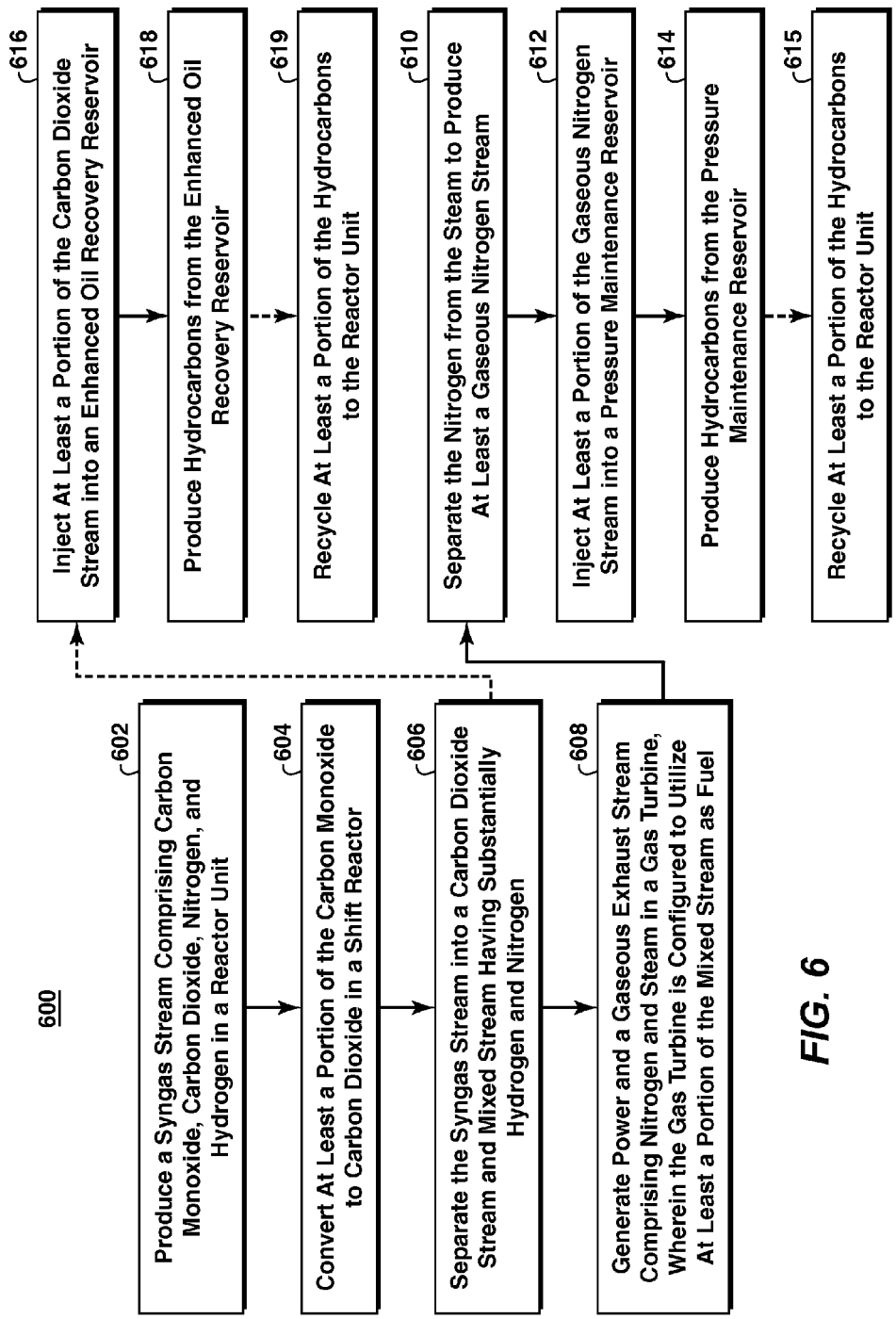
FIG. 6 is an exemplary flow chart of a method of operating an integrated system for low emission power generation and hydrocarbon recovery using a reactor unit like those shown in FIGS. 4-5.

FIG. 6 is an exemplary flow chart of a method of operating an integrated system for low emission power generation and hydrocarbon recovery using an auto-thermal reforming unit like those shown in FIGS. 4-5. As such, FIG. 6 may be best understood with reference to FIGS. 4-5. The method 600 includes producing 602 a syngas stream 505 comprising carbon monoxide, carbon dioxide, nitrogen, and hydrogen utilizing a reactor unit 402; converting 604 at least a portion of the carbon monoxide to carbon dioxide in a gas-water shift reactor 510 to form a shifted stream 511; separating 606 the carbon dioxide from the shifted stream 511 to produce a substantially carbon dioxide stream 416 and a mixed products stream 420 comprising substantially nitrogen and hydrogen; generating 608 power 436 and a gaseous exhaust stream 422 comprising nitrogen and steam in a gas turbine 404, wherein the gas turbine 404 is configured to utilize the mixed products stream 420 comprising substantially nitrogen and hydrogen as fuel; separating 610 the nitrogen from the steam to produce at least a gaseous nitrogen stream 430; injecting 612 at least a portion of the gaseous nitrogen stream 430" into a pressure maintenance reservoir 414; and producing 614 hydrocarbons from the pressure maintenance reservoir 414 via stream 415.

In one exemplary alternative embodiment, the method may further include injecting 616 at least a portion of the separated carbon dioxide stream 416 into an enhanced oil recovery reservoir 418; and producing 618 hydrocarbons from the enhanced oil recovery reservoir 418 via stream 417. Additionally, the method 600 may include recycling 619 at least a portion of the hydrocarbons produced 417 from the enhanced oil recovery reservoir 418 to the reactor unit 402; and recycling 615 at least a portion of the hydrocarbons produced 415 from the pressure maintenance reservoir 414 to the reactor unit 402.

Separation 606 may also separate any hydrogen sulfide ($H_2S$) present in stream 511 to remove it from mixed products stream 420 and thereby including $H_2S$ in stream 416. Stream 416 could then be further processed to convert the $H_2S$ into sulfur or injected into a reservoir 417 for sequestration or enhanced oil recovery.

In another embodiment of the method 600, air 410a is compressed in a dedicated air compressor 502 (or extracted from the gas turbine air compressor 514a) and sent to the reactor unit 402 together with methane 406 and steam 408. The air rate is adjusted to satisfy the heat balance between the exothermic and endothermic reactions in the reactor 402. The nitrogen in the air 504 passes through the reformer 402 (and shift reactors 510) as an inert gas and ends up as an acceptable (even preferred) fuel diluent in the hydrogen stream 420 that is sent to power generation. Separation 606 after the shift reactor 510 is performed to remove the $CO_2$ 416; the inert nitrogen is not removed and acts as a diluent for the $H_2$ fuel to the gas turbine 404. The flue gas (e.g. exhaust gas 422) from the gas turbine 404 consists of nitrogen and steam and is dried as needed and then utilized in petroleum production operations (e.g. reservoirs 414 and/or 418). Note that reservoirs 414 and 418 may have the same or similar properties to reservoirs 114 and 118 discussed above.

In one exemplary alternative embodiment, the reactor unit 402 may be one of an exothermic partial oxidation reactor, wherein the hydrocarbon fuel stream 406 is a carbonaceous hydrocarbon fuel stream or an endothermic steam reforming reactor, wherein the hydrocarbon fuel stream 406 is a natural gas fuel stream. In one exemplary system, an idealized equation for the partial oxidation reforming of a hydrocarbon may be:

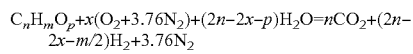

$$C_nH_mO_p + x(O_2 + 3.76N_2) + (2n - 2x - p)H_2O = nCO_2 + (2n - 2x - m/2)H_2 + 3.76N_2$$

Wherein x is the oxygen-to-fuel molar ratio. This ratio may be used to determine 1) the amount of water needed to convert the carbon to carbon dioxide, 2) the hydrogen yield (in moles), 3) the concentration (in mol %) of hydrogen in the product stream, and 4) the heat of reaction. When x=0, the equation reduces to the endothermic steam reforming reaction; when x=12.5, the equation is the partial oxidation combustion reaction. The molar ratio of oxygen contained in the air feed stream 410a to carbon (in hydrocarbon) in the fuel feed stream 406 (e.g. the value of "x") may be from about 0.45:1 to 0.85:1, or from about 0.6:1 to 0.7:1.

In one exemplary embodiment, the fuel feed stream 406 may comprise one or more additional gaseous components selected from the group consisting of heavier hydrocarbons having two or more carbon atoms (hereinafter referred to as C2+ hydrocarbons), carbon dioxide, nitrogen, and carbon monoxide.

In some examples of the disclosed systems 400 and 500 and methods 600, the molar ratio of steam 408 to carbon (in hydrocarbons) in the hydrocarbon fuel stream 406 that is introduced to the reactor 402 is up to about 3:1, or up to about 2.5:1. For example, the molar ratio of steam 408 to carbon (in hydrocarbons) in the hydrocarbon fuel stream 406 is within the range of 0:1 to 3:1, preferably, 0.3:1 to 3:1, in particular 1:1 to 2.5:1. The steam to carbon molar ratio is based on the carbon in the hydrocarbons of the fuel feed stream excluding carbon in any carbon dioxide and/or carbon monoxide that is present in the fuel feed stream. Where steam is present in a process stream, mole % is based on % of total wet molar flow rate of the stream under discussion. Optionally, the air feed stream also comprises steam. For example, the amount of steam in the air feed stream 410a is up to 10 mole %, in particular, up to 1 mole %.

Optionally, the hydrocarbon fuel stream 406 that is introduced to the reactor 402 comprises hydrogen. The presence of hydrogen in the hydrocarbon fuel stream 406 may be advantageous because the hydrogen may facilitate ignition of the hydrocarbon fuel stream 406 with the oxygen contained in the air feed stream 410a. For example, the amount of hydrogen in the fuel feed stream may be within the range of about 0 to about 20 mole %, or from about 2 to about 18 mole %.

In yet another exemplary embodiment of the disclosed systems 400 and 500 and methods 600, the hydrocarbon fuel stream 406 is introduced to the reactor 402 at a temperature in the range of about 350 to about 700° C., or about 400 to about 650° C., or about 425 to about 620° C. The hydrocarbon fuel stream 406 may be cross-exchanged with any one or more of streams 408, 428', 505, 504, 422, or some other stream. However, if the hydrocarbon fuel stream 406 is introduced to the reactor at a temperature above about 600° C., it may be preferred to boost the temperature of the hydrocarbon fuel stream 406 using an external heater (not shown). The air feed stream 410a or 504 may be similarly heated.

In some exemplary embodiments of the disclosed systems 400 and 500 and methods 600, the hydrocarbon fuel stream 406 may be produced by passing a pre-reformer feed stream comprising a hydrocarbon feedstock and steam through a pre-reformer (not shown) that contains a pre-reforming catalyst to obtain a hydrocarbon fuel stream 406 comprising methane, hydrogen, carbon monoxide, carbon dioxide and steam. If desired, the hydrogen content of the hydrocarbon fuel stream may be increased. This may be achieved by multiple step pre-reforming, by using high pre-reformer inlet temperatures, or by recycling hydrogen to the fuel feed stream. The hydrocarbon feedstock for hydrocarbon fuel stream 406 may be selected from the group consisting of natural gas, liquefied petroleum gas (LPG) and various petroleum distillates (e.g. naphtha). Additionally, a desulfurisation unit comprising a hydrogenator and a desulfuriser may be provided upstream of the reactor 402 and pre-reformer (if present) to remove sulfur containing compounds from the hydrocarbon feedstock (e.g. natural gas, LPG, or petroleum distillate).

In embodiments of the disclosed systems 400 and 500 and methods 600, the reactor 402 is an air driven reactor. In one exemplary embodiment, the air feed stream 410a or 504 is compressed in a multistage air compressor 502, for example a compressor having from 4 to 8 stages, preferably, 6 stages. Alternatively, the air may be compressed by integrated compressor 514a and sent to a boost compressor 502 for additional compression before entering the reactor 402. The shift converter 510 may be a single shift reactor containing a shift catalyst or it may comprise a high temperature shift reactor containing a high temperature shift catalyst and a low temperature shift reactor containing a low temperature shift catalyst.

In still further embodiments, suitable $CO_2$ separation units 512 include units that employ a membrane to separate the hydrogen stream from the concentrated carbon dioxide stream or units comprising a $CO_2$ absorber and $CO_2$ desorber that employ physical or chemical absorption solvents. In one exemplary embodiment, the carbon dioxide stream 416 may comprise at least about 98% $CO_2$ on a dry basis, the remainder being mostly hydrogen. In some cases, the mixed products stream 420 may comprise trace amount of carbon oxides (CO and $CO_2$) and methane, for example, less than 500 ppm on a molar basis.

In still further embodiments, the carbon dioxide stream 416 is dehydrated to reduce its water content such that the dehydrated $CO_2$ stream has a dew point of approximately $-1°$ C. at the transportation pressure of the carbon dioxide stream 416 thereby ensuring that liquid (water) will not condense out of the stream. For example, the carbon dioxide stream 416 may be dehydrated at a pressure of about 20 to about 60 barg. Suitably, the water content of the carbon dioxide stream 416 is reduced in a suction knock out drum. The carbon dioxide stream 416 may then be compressed and the compressed $CO_2$ stream is passed through at least one dehydration bed (formed from, for example, a molecular sieve or a silica gel) or through a glycol dehydration unit (for example, a triethylene glycol dehydration unit) to reduce the water content still further.

Preferably, the dehydrated carbon dioxide stream 416 is compressed and delivered to a pipeline for transfer to a reception facility of an oil or gas field where the carbon dioxide stream 416 is used as an injection gas in the oil or gas reservoir 418. The carbon dioxide stream 416 may be further compressed to above the pressure of the enhanced recovery reservoir 418 of the oil or gas field before being injected into the reservoir. The injected $CO_2$ displaces the hydrocarbons towards an associated production well for enhanced recovery of hydrocarbons therefrom.

An advantage of the process of the present invention is that the synthesis gas stream 505 and hence the hydrogen stream 420 have a relatively high nitrogen content. Accordingly, the hydrogen may be sufficiently diluted with nitrogen that there is no requirement to dilute the hydrogen stream 420 with additional water in order to control the levels of NOx in the exhaust 422 from the gas turbine 404. For example, the level of NOx in the exhaust gas may be less than about 60 ppm, or less than about 25 ppm. In another example, the hydrogen stream 420 may contain about 35 to about 65% by volume hydrogen, more preferably, 45 to 60% by volume hydrogen, for example, 48 to 52% by volume of hydrogen.

In still further exemplary embodiments of the disclosed systems 400 and 500 and methods 600, the heat recovery unit 426 is a heat recovery and steam generator unit (HRSG) that generates and superheats additional steam for use in the steam turbine 432 and elsewhere in the systems 400 and 500. Thus, the HRSG 426 is capable of generating high pressure (HP) steam, medium pressure (MP) steam and low pressure (LP) steam and of superheating these steam streams. The HRSG 426 may also be capable of reheating MP steam that is produced as an exhaust stream from the high pressure stage of a multistage steam turbine 432. For example, the superheated HP steam that is produced in the HRSG 426 is at a pressure in the range of about 80 to about 200 barg and a temperature in the range of about 450 to about 600° C. The superheated MP steam may, for example, be generated in the HRSG 426 at a pressure in the range of about 25 to about 50 barg and a temperature in the range of about 300 to about 400° C. Further, the superheated LP steam may, for example, be generated in the HRSG 426 is at a pressure in the range of about 2 to about 10 barg and a temperature in the range of about 200 to about 300° C. In still another alternative embodiment, the heat recovery in the HRSG 426 may occur at elevated pressure. In such a process, the volume of the gaseous exhaust stream 422 can be significantly reduced and the water condenses out at a higher temperature; this makes the removal of the water easier to accomplish and the heat of condensation available at a higher temperature which is more valuable for power generation 434 or desalination (not shown).

In one exemplary embodiment of the present invention, the cooled exhaust gas 430 is recycled from the HRSG 426 to either or both of the inlet air stream 410b via line 430' and injected into the pressure maintenance reservoir 414 via line 430". In either case, the stream may require additional cleanup or drying similar to the processes described above with respect to carbon dioxide stream 416. The stream 430" may also be pressurized via a compressor prior to injection. The stream 430" may also be treated further to remove traces of oxygen before injection.

Figure 7:
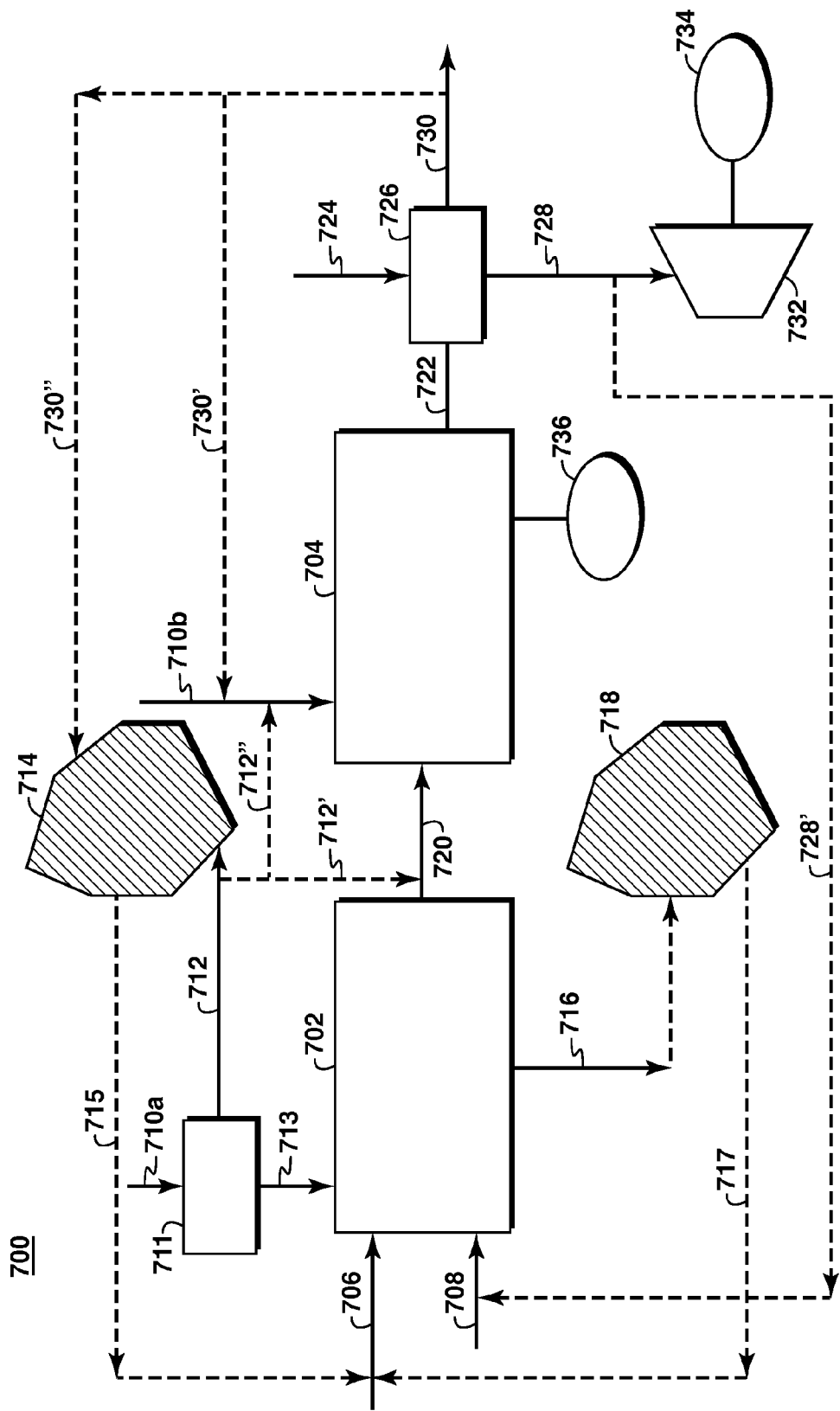
FIG. 7 is an illustration of an alternative embodiment of the integrated system for low emission power generation and hydrocarbon recovery using a reactor unit similar to that shown in FIGS. 4-5.

FIG. 7 is an illustration of an alternative embodiment of the integrated system for low emission power generation and hydrocarbon recovery using a reactor unit similar to that shown in FIGS. 4-5. As such, FIG. 7 may be best understood with reference to FIGS. 4-5. The system 700 comprises an air separation unit 711 configured to generate a substantially nitrogen stream 712 and a substantially oxygen stream 713, a reactor unit 702 configured to utilize the substantially oxygen stream 713, a hydrocarbon fuel stream 706 and a steam stream 708 to produce a carbon dioxide ($CO_2$) stream 716 and a hydrogen stream 720, wherein the carbon dioxide stream 716 may be directed to an enhanced oil recovery reservoir 718 for use in hydrocarbon recovery operations, such as production of a hydrocarbon stream 717. The nitrogen stream 712 may be utilized to dilute the hydrogen stream 720 via line 712' or may be directed to a pressure maintenance reservoir 714 for use in hydrocarbon recovery operations, such as production of a hydrocarbon stream 715.

In some embodiments, a gas turbine unit 704 is also provided, which utilizes an air stream 710b and the hydrogen stream 720 to generate power 736 and a gaseous exhaust stream 722, which may be directed to a heat recovery unit 726 configured to utilize water 724 to cool the gaseous exhaust stream 722 to form a cooled exhaust stream 730 and produce at least one unit of steam 728 for use in steam generator 732 to produce power 734. In additional alternative embodiments, some nitrogen may be utilized to dilute the air stream 710b coming into the gas turbine 704 via line 712". In some alternative embodiments, at least a portion of the steam 728 may be redirected to combine with the steam stream 708 via stream 728'. In yet another alternative embodiment, air stream 710b may be compressed by the compressor integrated into the gas turbine 704.

Figure 8:
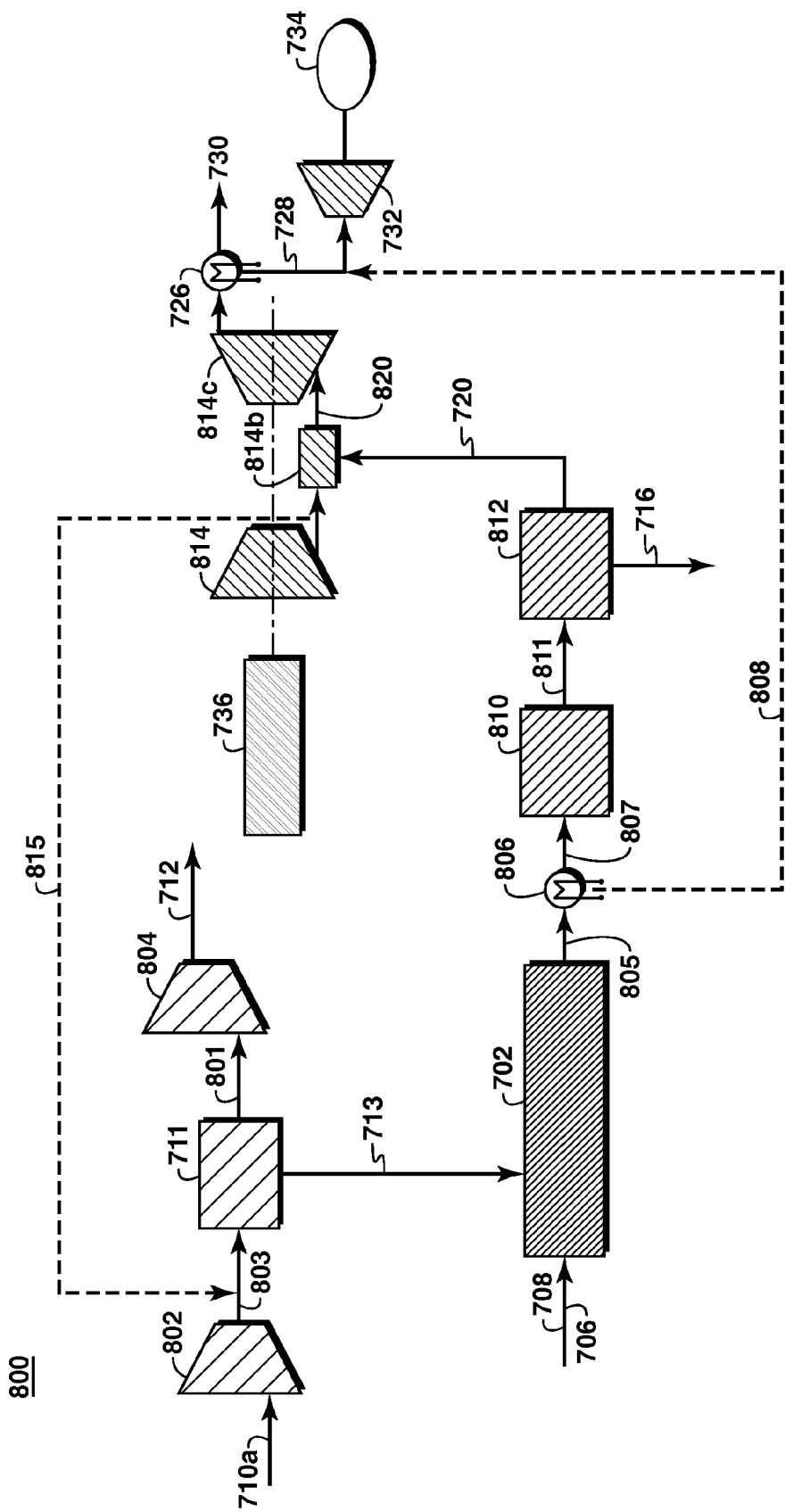
FIG. 8 illustrates a schematic of an integrated system for low emission power generation and hydrocarbon recovery using a reactor unit like that shown in FIG. 7.

FIG. 8 illustrates a schematic of an integrated system for low emission power generation and hydrocarbon recovery using a reactor unit like that shown in FIG. 7. As such, FIG. 8 may be best understood with reference to FIG. 7. System 800 is an alternative, exemplary embodiment of the system 700 and includes an inlet air compressor 802 to generate compressed air stream 803 to feed the ASU 711, and a stand-alone compressor 804 to compress the nitrogen stream 712. The reactor unit 702 produces a syngas stream 805 comprising carbon monoxide, carbon dioxide, and hydrogen, which may be fed to a water-gas shift reactor 810 to convert at least a portion of the carbon monoxide to carbon dioxide to form a shifted stream 811 comprising substantially carbon dioxide, and hydrogen, which may be sent to a separator 812, which separates as much of the carbon dioxide as possible into stream 716 to produce the hydrogen stream 720. The gas turbine 704 includes an integrated compressor 814a, combustor 814b, and expander 814c. The hydrogen stream 720 may then be mixed and combusted (pre-mixed or other arrangement, as discussed above) with the high pressure air from integrated compressor 814a to form combustion products stream 820, which may then be expanded via expander 814c. Optionally, compressed air may be routed from the inlet compressor 814a to the inlet stream 804 via stream 815.

In one exemplary alternative embodiment, the integrated compressor 814a is the same as the compressor 802 and a portion of the high pressure air 803 is used in the reactor unit 702, while the remainder is used in the combustor 814b. In addition, the system 800 may optionally include a heat exchanger 806 configured to form an optional steam stream 808 utilizing the heat from syngas stream 805 to form slightly cooled syngas stream 807. Optional steam stream 808 may be added to steam stream 728 or 728' or utilized with steam stream 708. As with reactor 402, the reactor 702 may be configured to operate in an exothermic partial oxidation reaction, wherein the hydrocarbon fuel stream 706 is a carbonaceous hydrocarbon or in an endothermic steam reforming reaction, wherein the hydrocarbon fuel stream 706 is a natural gas fuel stream.

Figure 9:
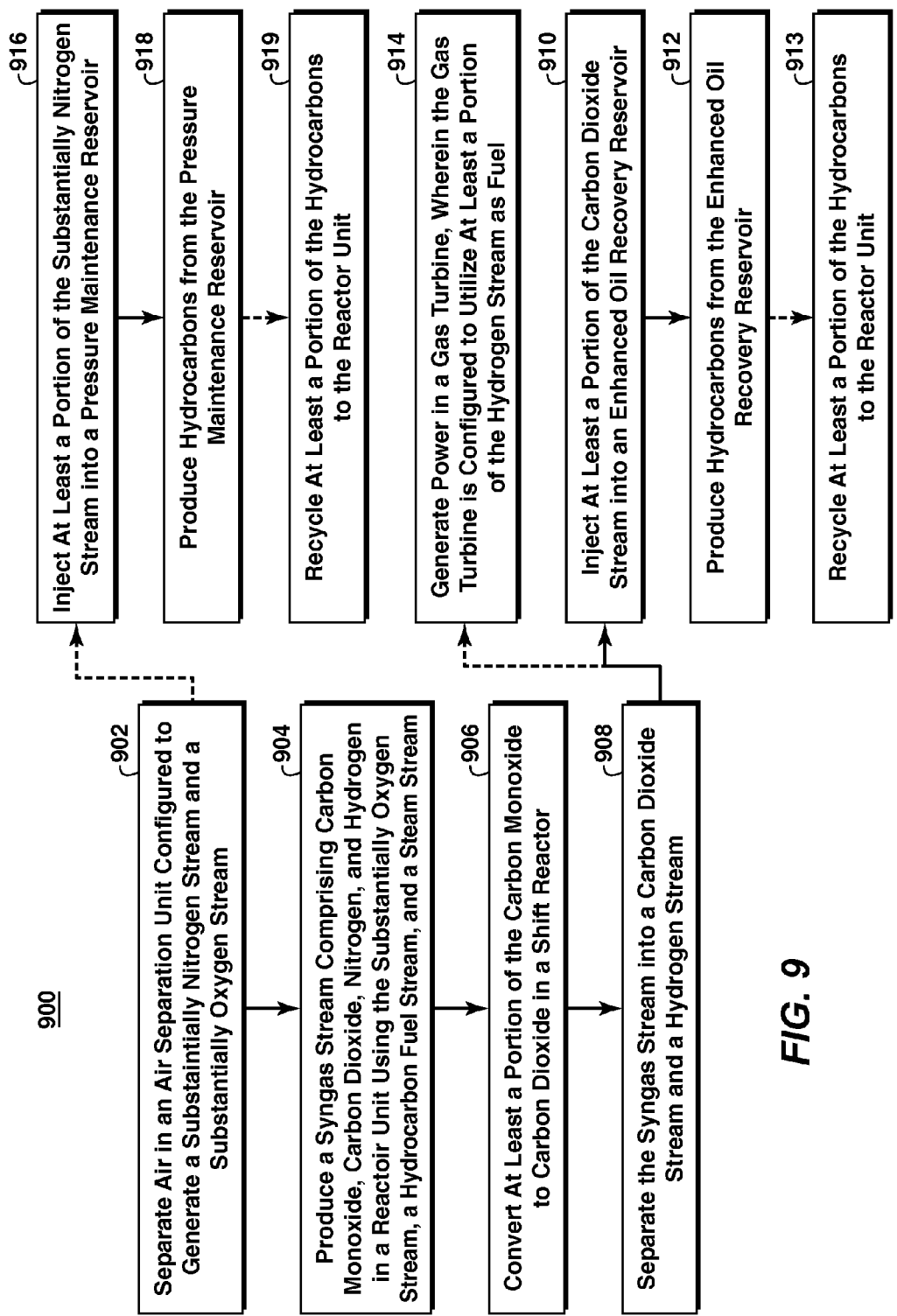
FIG. 9 is an exemplary flow chart of an alternative method of operating an integrated system for low emission power generation and hydrocarbon recovery using a reactor unit like those shown in FIGS. 7-8.

FIG. 9 is an exemplary flow chart of an alternative method of operating an integrated system for low emission power generation and hydrocarbon recovery using a reactor unit like those shown in FIGS. 7-8. As such, FIG. 9 may be best understood with reference to FIGS. 7-8. The method 900 includes separating air 902 in an air separation unit 711 configured to generate a substantially nitrogen stream 712 and a substantially oxygen stream 713; producing 904 a syngas stream 805 comprising carbon monoxide, carbon dioxide, and hydrogen using a reactor unit 702 configured to utilize the substantially oxygen stream 713, a hydrocarbon fuel stream 706, and a steam stream 708; converting 906 at least a portion of the carbon monoxide to carbon dioxide in a gas-water shift reactor 810 to form a shifted stream 811; separating 908 the shifted stream 811 into a carbon dioxide stream 716 and a hydrogen stream 720; injecting 910 at least a portion of the separated carbon dioxide stream into an enhanced oil recovery reservoir; and producing 912 hydrocarbons from the enhanced oil recovery reservoir 718.

Additionally, the method 900 may optionally include generating 914 power 736 in a gas turbine 704, wherein the gas turbine 704 is configured to utilize at least a portion of the hydrogen stream 720 as fuel; injecting 916 at least a portion of the substantially nitrogen stream 712 into a pressure maintenance reservoir 714; and producing 916 hydrocarbons from the pressure maintenance reservoir 714. In a further alternative embodiment, the method 900 may optionally include recycling 913 at least a portion of the hydrocarbons produced from the enhanced oil recovery reservoir 718 to the reactor unit 702 via line 717; and recycling 919 at least a portion of the hydrocarbons produced from the pressure maintenance reservoir 714 to the reactor unit 702 via line 715.

In some embodiments of the disclosed systems 700 and 800 and methods 900 air 710a is compressed to feed an Air Separation Unit (ASU) 711, which may be a cryogenic unit. Air feed pressure may be in the range of about 6 to about 10 barg for efficient operation of the ASU 711. The nitrogen product stream 712 may be pumped or compressed via compressor 804 to the pressure desired for the petroleum production operation for which product nitrogen is destined. The oxygen product stream 713 may be pumped or compressed to the pressure desired for injection to the reactor unit 702. The oxygen feed rates to the reactor unit 702 are adjusted to satisfy the heat balance between the exothermic and endothermic reactions in the reactor.

Additionally and optionally, the reactor reforming step 904 is preferably carried out at a pressure needed to supply fuel to the gas turbine 704 (typically about 50 to about 200 psig above gas turbine combustion pressure). The product from the reforming step is a syngas mixture 805 comprising CO, $H_2$, $CO_2$, $H_2O$, and small amounts of other components. After optional heat recovery steam generation in heat exchanger 806 (which may be the same unit as HRSG 726 in some embodiments) for additional power generation in the steam turbine(s) 732 and optional $H_2O$ addition, the stream 807 is shifted to convert most of the CO to $CO_2$ (yielding more hydrogen), and a separation 908 is performed to remove the $CO_2$. Separation can be via conventional acid gas scrubbing, or any other effective process, as discussed above. The removed $CO_2$ 716 is conditioned as required (as discussed above) for petroleum production operations and transported for sequestration or for injection in an enhanced oil recovery reservoir 718.

Hydrogen stream 720 is used for power generation 736. The hydrogen 720 may be used in any power generating cycle, but is advantageously used as feed to a gas turbine power system 704, more advantageously to a combined cycle gas turbine power system. Some fraction of the steam 728 that is produced in the reactor heat recovery steam generator 726 or in the combined cycle gas turbine power system 704 may be used as the reactor feed steam 708. In yet another alternative embodiment, at least a portion of the nitrogen 712' may be used to dilute the hydrogen 720 prior to the hydrogen's use as fuel in a gas turbine system 704.

In particular embodiments of the systems 700 and 800 and methods 900 the air separation unit(s) (ASU) 711 may be based on cryogenic separation or separation utilizing a mole sieve. At the low end of the oxygen purity spectrum for the cryogenic-based ASU is an ASU design optimized for high-purity nitrogen production, resulting in oxygen purity below about 70%. This stream may contain nitrogen levels greater than 20%. At the other end of the spectrum is an ASU design optimized for high-purity oxygen production in which even Argon is separated from the oxygen, resulting in oxygen purity close to 100%.

In some embodiments of the present disclosure, the ASU 711 is a cryogenic process for separating nitrogen 712 and oxygen 713 from air. The cost associated with the ASU 711 generally depends on the desired purity of the products. Producing 99.5% pure oxygen requires a significant increase in capital and horsepower compared to an ASU that produces 95% oxygen. Therefore, the purity of the oxygen that is used in the reactor should be limited based on the specification of the syngas stream 805. If a high purity stream is required then high purity oxygen may be required.

Fuel contaminates should also be considered. Generally, only fuels that produce byproducts that can meet the EOR specification or fuels that are at a significantly high enough economic advantage so that the processing equipment to remove them can be justified should be considered.

Where a market exists for Argon, the additional cost, power, and complexity for its separation in the ASU 711 may be justified.

While the present invention may be susceptible to various modifications and alternative forms, the exemplary embodiments discussed above have been shown only by way of example. However, it should again be understood that the invention is not intended to be limited to the particular embodiments disclosed herein. Indeed, the present invention includes all alternatives, modifications, and equivalents falling within the true spirit and scope of the appended claims.

What is claimed is:

1. An integrated system, comprising:
  a pressure swing reformer unit configured to utilize an air stream, a natural gas stream, and a steam stream to produce a regeneration stream comprising substantially nitrogen and a syngas stream comprising carbon monoxide, carbon dioxide, and hydrogen;
  a pressure maintenance reservoir to receive at least a portion of the regeneration stream comprising substantially nitrogen;
  a water-gas shift reactor configured to convert at least a portion of the carbon monoxide to carbon dioxide;
  a separation unit configured to separate the syngas stream into a carbon dioxide stream and a hydrogen stream;
  an enhanced oil recovery reservoir to receive at least a portion of the carbon dioxide stream;
  a first production stream produced from the pressure maintenance reservoir, wherein at least a portion of the first production stream is combined with the natural gas stream; and
  a second production stream produced from the enhanced oil recovery reservoir, wherein at least a portion of the second production stream is combined with the natural gas stream.

2. The system of claim 1, further comprising a gas turbine configured to utilize the hydrogen stream to generate power and a gaseous exhaust stream.

3. The system of claim 2, further comprising a heat recovery unit configured to receive and cool the gaseous exhaust stream, produce at least one unit of heat energy, and generate at least a volume of water and a cooled gaseous stream, wherein the heat energy is utilized to generate steam.

4. The system of claim 3, wherein the steam is utilized in a manner selected from the group consisting of: 1) generate steam power in a steam turbine, 2) recycle to the pressure swing reformer unit, and 3) any combination thereof.

5. An integrated pressure maintenance reservoir system, comprising:
   a pressure swing reformer unit,
   an air source operatively connected to the pressure swing reformer unit,
   a natural gas source operatively connected to the pressure swing reformer unit,
   a steam source operatively connected to the pressure swing reformer unit,
   a regeneration stream comprising substantially nitrogen, the regeneration stream prepared by the pressure swing reformer unit,
   a syngas stream comprising carbon monoxide, carbon dioxide, and hydrogen, the syngas stream prepared by the pressure swing reformer unit;
   a pressure maintenance reservoir operatively connected to at least a portion of the regeneration stream;
   an enhanced oil recovery reservoir operatively connected to at least a portion of the syngas stream;
   a first production stream produced from the pressure maintenance reservoir, wherein at least a portion of the first production stream is combined with the natural gas stream; and
   a second production stream produced from the enhanced oil recovery reservoir, wherein at least a portion of the second production stream is combined with the natural gas stream.

6. The integrated pressure maintenance reservoir system of claim 5, further comprising:
   a water-gas shift reactor operatively connected to the pressure swing reformer unit and configured to receive at least a portion of the syngas stream, the water-gas shift reactor configured to convert at least a portion of the carbon monoxide to carbon dioxide; and
   a separation unit operatively connected to the pressure swing reformer unit configured to separate the syngas stream into a carbon dioxide stream and a hydrogen stream.

7. The integrated pressure maintenance reservoir system of claim 5, wherein the pressure swing reformer unit operates at 300-500 psig.

8. The integrated pressure maintenance reservoir system of claim 5, further comprising a gas turbine configured to utilize the hydrogen stream to generate power and a gaseous exhaust stream.

* * * * *